(12) United States Patent
Shima

(10) Patent No.: US 7,486,223 B2
(45) Date of Patent: Feb. 3, 2009

(54) RADAR APPARATUS

(75) Inventor: Nobukazu Shima, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 0 days.

(21) Appl. No.: 11/858,044

(22) Filed: Sep. 19, 2007

(65) Prior Publication Data

US 2008/0158056 A1 Jul. 3, 2008

Related U.S. Application Data

(63) Continuation of application No. 11/071,939, filed on Mar. 4, 2005, now Pat. No. 7,289,058.

(30) Foreign Application Priority Data

Jun. 21, 2004 (JP) ............................. 2004-182537

(51) Int. Cl.
*G01S 13/00* (2006.01)
*G01S 13/93* (2006.01)

(52) U.S. Cl. .................. 342/70; 342/117; 342/147; 342/195; 342/74

(58) Field of Classification Search .................... 342/70
See application file for complete search history.

(56) References Cited

U.S. PATENT DOCUMENTS

| | | | |
|---|---|---|---|
| 3,868,695 A | 2/1975 | Kadak | |
| 4,924,235 A | 5/1990 | Fujisaka et al. | |
| 5,008,678 A | 4/1991 | Herman | |
| 5,657,027 A | 8/1997 | Guymon, II | |
| 5,767,793 A | 6/1998 | Agravante et al. | |
| 5,955,991 A | 9/1999 | Kawakubo | |
| 6,067,048 A | 5/2000 | Yamada | |
| 6,288,672 B1 | 9/2001 | Asano et al. | |
| 6,292,129 B1 | 9/2001 | Matsugatani et al. | |
| 6,292,135 B1 | 9/2001 | Takatori et al. | |
| 6,337,656 B1 | 1/2002 | Natsume et al. | |
| 6,339,395 B1 * | 1/2002 | Hazumi et al. | 342/196 |
| 6,445,339 B1 | 9/2002 | Yamada | |
| 6,573,859 B2 | 6/2003 | Tokoro | |

(Continued)

FOREIGN PATENT DOCUMENTS

EP 0898174 2/1999

(Continued)

*Primary Examiner*—Thomas H Tarcza
*Assistant Examiner*—Matthew M Barker
(74) *Attorney, Agent, or Firm*—Fogg & Powers LLC

(57) ABSTRACT

A radar apparatus is provided which includes a plurality of antennas arranged at unequally spaced intervals in a single row, the plurality of antennas configured to transmit a radio wave as transmitting antennas during continued multiple periods, and receive a reflected radio wave as receiving antennas during the continued multiple periods. A plurality of transceivers are included for transmitting a radio wave from the transmitting antennas and receiving received signals from the receiving antennas, said received signals representing the reflected wave received at the receiving antennas. A signal processing unit is included for selecting a transceiver which transmits a radio wave during each of the continue multiple periods, selecting transceivers which receive the received signals from the receiving antennas during each of the continued multiple periods, and perform digital beam forming with a first receiving signal channel group and a second receiving signal channel group.

15 Claims, 18 Drawing Sheets

U.S. PATENT DOCUMENTS

| | | |
|---|---|---|
| 2003/0052813 A1 | 3/2003 | Natsume |
| 2004/0246168 A1 | 12/2004 | Isaji |
| 2006/0066474 A1 | 3/2006 | Shirakawa |

FOREIGN PATENT DOCUMENTS

| | | |
|---|---|---|
| EP | 0987561 | 9/1999 |
| EP | 1486796 | 12/2004 |
| JP | 63256879 | 10/1988 |
| JP | 7120547 | 5/1995 |
| JP | 11160423 | 6/1999 |
| JP | 11311668 | 11/1999 |
| JP | 2000155171 | 6/2000 |

* cited by examiner

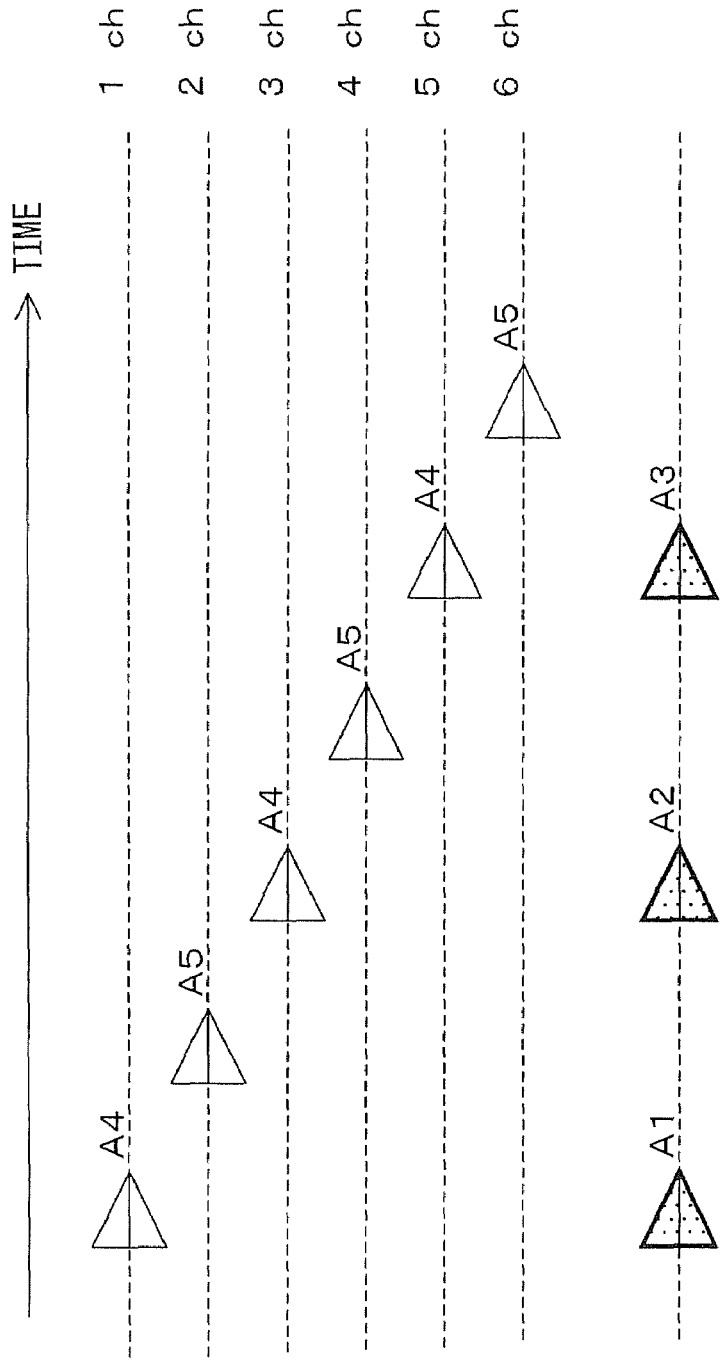

RADAR APPARATUS

CROSS-REFERENCE TO RELATED APPLICATION

This application is a continuation of application Ser. No. 11/071,939 filed on Mar. 4, 2005 now U.S. Pat. No. 7,289,058, entitled "RADAR APPARATUS" which is incorporated herein by reference and which claims priority under 35 U.S.C. 119 to Japanese Patent Application Number 2004-182537, filed on Jun. 21, 2004.

BACKGROUND OF THE INVENTION

1. Field of the Invention

The present invention relates to a radar apparatus that uses a frequency-modulated continuous wave (FW-CW) as a transmit wave and, more particularly, to a radar apparatus that performs scanning for receiving reflected waves of a transmitted radiowave by digital beam forming (DBF).

2. Description of the Related Art

Various radar apparatuses, of a type that performs scanning on receive by using DBF, have been developed and are known in the prior art. Generally, the basic configuration of this type of radar apparatus employs a single transmitting antenna and a plurality of receiving antennas, and a radiowave is transmitted from the transmitting antenna and reflected waves of the transmitted radiowave are received by the plurality of antennas.

However, the radar apparatus of this configuration requires as many receivers as there are receiving antennas, and a large number of receivers must be provided if the scanning accuracy is to be enhanced. This has presented the problem that as the number of receivers increases, the weight and size of the apparatus increases and, what is more, a large amount of power is needed.

To solve the above problem, radar apparatuses that achieve size and weight reductions are proposed, for example, in Japanese Unexamined Patent Publication Nos. S63-256879, H11-311668, and H11-160423. Such radar apparatuses are constructed so that a plurality of receiving antennas are connected to a single receiver via a switch. Alternatively, a plurality of receiving antennas are divided into several groups, that is, a receiving antenna array comprising a large number of receiving antennas is divided into subarrays each with four receiving antennas, for example, and one receiver is provided for each subarray of four receiving antennas, the four receiving antennas being connected to the receiver via a switch. When receiving reflected waves of a transmitted radiowave, the plurality of antennas are sequentially switched for connection to the receiver. In this way, radar signals received at the respective receiving antennas can be obtained in a time-division fashion.

With this configuration, the number of receivers can be reduced to one or to less than the number of receiving antennas, thus achieving a reduction in the size and cost of the apparatus.

Here, the radiowave used by the radar apparatus is a radiowave in a high-frequency band such as a 76-GHz band. Accordingly, the signals handled in the transmission paths from the receiving antennas to the receiver are also high-frequency band signals. The number of inputs on a switch that can switch such high-frequency signals is generally two or three.

Accordingly, when switching between four or more receiving antennas, it is practiced to use a plurality of switches. For example, unit switches, each being a single-pole double-throw (SPDT) or a single-pole three-throw (SP3T) switch, are combined in tree type to achieve multiple switching. Here, a high-frequency switch of planar circuit type, such as a monolithic microwave integrated circuit (MMIC) or a hybrid integrated circuit (HIC), is used as the unit switch.

However, when the switches are connected in multiple stages, signal attenuation increases as the signal passes through each switch, and hence the problem that, as the number of stages of switches is increased to reduce the number of receivers, reception sensitivity decreases, appears.

In view of this, a radar apparatus relatively simple in configuration and capable of preventing the degradation of reception sensitivity is proposed, for example, in Japanese Unexamined Patent Publication No. 2000-155171. While the radar apparatuses earlier described comprise a single transmitting antenna and a plurality of receiving antennas, the radar apparatus disclosed in this patent document employs a plurality of transmitting antennas, which are used by being switched from one to another, and thereby reduces the number of receiving antennas as well as the number of switches used to switch between the receiving antennas. It is claimed that with this configuration, reception sensitivity can be increased, while reducing the cost of the apparatus by reducing the number of antennas and switches.

This radar apparatus comprises four transmitting antennas A1 to A3 and two receiving antennas A4 and A5 arranged in a straight line on the same plane, the total number of antennas being smaller than that in any of the prior known radar apparatuses. It is claimed that this radar apparatus configuration makes the fabrication of the radar apparatus easier, can reduce the cost and, in applications such as automotive radar, can make the overall shape of the radar suitable for mounting on a vehicle.

According to the above radar apparatus, the attenuation of received signals due to switches can be reduced, and a number of channels larger than the number of antennas can be achieved with fewer antennas. According to the above radar apparatus, more channels can be achieved in DBF than there are antennas and, to obtain a narrower beam of higher directivity and, for example, to achieve nine channels, the number of antennas can be reduced to six, compared with 10 required in the prior art configuration, but when the antennas are mounted to construct the radar apparatus, as the antennas are arrayed in a single row, the six antennas require a mounting space equivalent to ten antennas.

On the other hand, when such a radar apparatus is mounted as an electronic apparatus, for example, on an automobile or the like, the position where it can be mounted so as to transmit the radiowave forward is limited, and the available mounting space is quite restricted. The radar apparatus used in such an environment must be made as small as possible. Accordingly, while the number of antennas can be reduced, the above radar apparatus still leaves much to be desired when it comes to size reduction. Furthermore, from the standpoint of vehicle driving safety, it is desired to further increase the performance of the radar apparatus for recognizing targets ahead of the vehicle, and it is also desired to reduce the cost of the apparatus.

Accordingly, it is an object of the present invention to provide a radar apparatus that can achieve a size reduction, a performance increase, and a cost reduction while achieving multiple channels, by minimizing the number of antennas necessary to perform scanning by digital beam forming (DBF) for reception of the reflected waves of a transmitted radiowave, and that can also achieve enhancements in the speed and accuracy of azimuth detection.

SUMMARY OF THE INVENTION

To solve the above problem, according to the present invention, there is provided a radar apparatus which comprises a plurality of antennas having identical antenna characteristics and arranged at unequally spaced intervals in a single row, a transmitter for transmitting a radiowave from at least one antenna selected from among the plurality of antennas, a receiver for receiving a reflected wave of the transmitted radiowave at each of the antennas, and a signal processing unit for performing digital beam forming based on a received signal representing the received reflected wave, the radar apparatus further comprising: a first selector switch for supplying a transmit signal of the radiowave to each of the antennas by sequentially selecting the antennas; and a second selector switch for supplying the received signal, representing the reflected wave received at each of the antennas, to the receiver by sequentially switching the antennas for connection to the receiver, and wherein: in accordance with a receiving signal channel switching sequence relating to antenna transmission and reception for the digital beam forming, when the antennas are sequentially selected by the first selector switch and the radiowave is transmitted from the selected antenna for each cycle of the transmit signal, the second selector switch selects from among the plurality of antennas an antenna for receiving the reflected wave of the transmitted radiowave and supplies the received signal to the receiver. Here, all of the antennas can be used for both transmission and reception.

When the receiving signal channel switching sequence selects only odd-numbered receiving signal channels or only even-numbered receiving channels, the second selector switch selects the signal received via the antenna if the received signal corresponds to any one of the odd-numbered receiving signal channels or the even-numbered receiving channels, or when the receiving signal channel switching sequence selects only the odd-numbered receiving signal channels or only the even-numbered receiving channels, the receiver supplies the received signal to the signal processing means if the received signal corresponds to any one of the odd-numbered receiving signal channels or the even-numbered receiving channels.

The receiving signal channel switching sequence includes a switching sequence for selecting all receiving signal channels and a switching sequence for selecting only the odd-numbered receiving signal channels or only the even-numbered receiving channels, and either one of the switching sequences is selected in accordance with an environment in which the signal processing unit performs azimuth detection.

Alternatively, when the receiving signal channel switching sequence selects only receiving signal channels located in a left half portion, the second selector switch selects the signal received via the antenna if the received signal corresponds any one of the receiving signal channels in the left half portion, and when the receiving signal channel switching sequence selects only receiving signal channels located in a right half portion, the second selector switch selects the signal received via the antenna if the received signal corresponds any one of the receiving signal channels in the right half portion.

Further, when the receiving signal channel switching sequence selects only the receiving signal channels located in the left half portion, the receiver supplies the received signal to the signal processing unit if the received signal corresponds any one of the receiving signal channels in the left half portion, and when the receiving signal channel switching sequence selects only the receiving signal channels located in the right half portion, the receiver supplies the received signal to the signal processing unit if the received signal corresponds any one of the receiving signal channels in the right half portion; here, the signal processing unit performs processing for azimuth detection for the receiving signal channels in the left half portion and for the receiving signal channels in the right half portion, separately.

In the radar apparatus of the present invention, the plurality of antennas are arranged such that the ratio of the antenna spacing between a predetermined pair of adjacent antennas to the antenna spacing between another pair of adjacent antennas is 1:2, wherein the plurality of antennas include first to fourth antennas arrayed in sequence along a straight line, and the first and second antennas are arranged with a first spacing while the second and third antennas and the third and fourth antennas, respectively, are arranged with a second spacing, the second spacing being twice as large as the first spacing. Further, the signal processing unit forms multiple digital beams of eleven channels based on the received signals received at the first to fourth antennas.

The first antenna sequentially transmits radiowaves over a plurality of cycles of the transmit signal, and reflected waves of the radiowaves sequentially transmitted cycle by cycle are sequentially received by the second antenna, the third antenna, and the fourth antennas in this order; then, the second antenna, the third antenna, and the fourth antennas in this order sequentially transmit the transmit signal with the same cycle, the reflected wave of each transmitted radiowave is received by the first antenna, and the received signal that corresponds to any one of the odd-numbered receiving signal channels or the even-numbered receiving channels is supplied to the signal processing unit.

The first antenna and the second antenna alternately transmit the transmit signal with the same cycle, the third antenna and the fourth antenna receive reflected waves of the radiowaves sequentially transmitted with the same cycle, and received signals corresponding to the receiving signal channels located in the left half portion of the plurality of receiving signal channels are supplied to the signal processing unit; then, the third antenna and the fourth antenna alternately transmit the transmit signal with the same cycle, the first antenna and the second antenna receive reflected waves of the radiowaves sequentially transmitted with the same cycle, and received signals corresponding to the receiving signal channels located in the right half portion of the plurality of receiving signal channels are supplied to the signal processing unit.

In the radar apparatus of the present invention, each of the plurality of antennas is provided with a transmitting port and a receiving port, and a transmitter is connected to each transmitting port, while a receiver is connected to each receiving port; here, each transmitting port is selectively connected to a common transmitter, and each receiving port is connected to a common receiver.

Each of the plurality of antennas is provided with a bidirectional switch for switching between transmission and reception, and the bidirectional switch, when thrown to a position for transmission, connects an associated one of the antennas to the transmitter and, when thrown to a position for reception, connects the associated one of the antennas to the receiver.

A transceiver in which an output port of the transmitter and a receiving port of the receiver are shared for transmission and reception is provided for each of the plurality of antennas, wherein the transceiver is provided common to the plurality of antennas and is connected to a selected one of the antennas for transmission or reception; here, the number of transceivers provided is smaller than the number of the plurality of antennas, and the transceiver is connected by a time-division switch to the selected antenna for the transmission or the reception.

The radar apparatus of the present invention further comprises a voltage-controlled oscillator for supplying a reference signal to the transmitter and the receiver, wherein the voltage-controlled oscillator is shared by the transmitter and the receiver that are provided common to the plurality of antennas.

In the radar apparatus of the present invention, the plurality of antennas include four antennas arranged at unequally spaced intervals along a straight line, and the signal processing unit is configured to be able to form multiple digital beams of eleven channels based on the received signals received at the respective antennas in accordance with the receiving signal channel switching sequence, or the signal processing unit is configured to be able to form multiple digital beams of a plurality of channels fewer than eleven channels based on some of the received signals received at the respective antennas in accordance with the receiving signal channel switching sequence.

As described above, the radar apparatus of the present invention is constructed to transmit a radiowave from at least one antenna selected from among the plurality of antennas arranged in a straight line on the same plane, and to receive the reflected waves of the transmitted radiowave at the respective antennas; accordingly, not only can a larger number of channels be obtained with fewer antennas than that in conventional radar apparatuses, but also the size and cost of the radar apparatus can be reduced. Further, when all of the plurality of antennas are used for both transmission and reception, the number of channels can be greatly increased, and the directivity when the received signals are combined can be increased, serving to enhance the performance of the radar apparatus.

Further, in the radar apparatus of the present invention, as the number of antennas is reduced compared with the prior art radar apparatus configuration, and as the plurality of antennas are arranged at a strategically chosen spacing, digital beams of multiple channels can be formed, while achieving reductions in the size and the cost of the apparatus.

In the radar apparatus of the present invention, as the formation of digital beams of multiple channels is achieved with a minimum number of antennas by arranging the plurality of antennas at a strategically chosen spacing, the fine channel switching sequence which uses all the channels or the coarse channel switching sequence which uses only the odd-numbered channels can be selected according to the using environment of the radar apparatus; in normal operation, the coarse channel switching sequence is selected to increase the processing speed for azimuth detection.

Furthermore, in the radar apparatus of the present invention, as the formation of digital beams of multiple channels is achieved with a minimum number of antennas by arranging the plurality of antennas at strategically chosen spacing, all the channels can be divided into a left-half group and a right-half group to provide a left-side channel switching sequence and a right-side channel switching sequence so that the processing for azimuth detection can be performed twice for the same target object; this serves to enhance the accuracy of azimuth detection.

The radar apparatus configuration described above makes the fabrication of the radar apparatus easier and achieves a reduction in cost and, when applying the radar apparatus, for example, as an anti-collision radar apparatus to be mounted on a vehicle or the like, the overall shape of the radar apparatus can be made suitable for mounting on the vehicle, and the processing for azimuth detection can be made faster and efficient, offering advantages in collision avoidance applications.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 20 is a diagram for explaining the formation of receiving channels in the receiving operations of antennas according to the radar apparatus shown in FIG. 19.

DESCRIPTION OF THE PREFERRED EMBODIMENTS

For a better understanding of the effect to be achieved by the present invention, first the configuration of a previously proposed radar apparatus, that forms the basis for the present invention, will be described in detail below. One example of the proposed radar apparatus will be described with reference to FIGS. 19 and 20.

Figure 19:
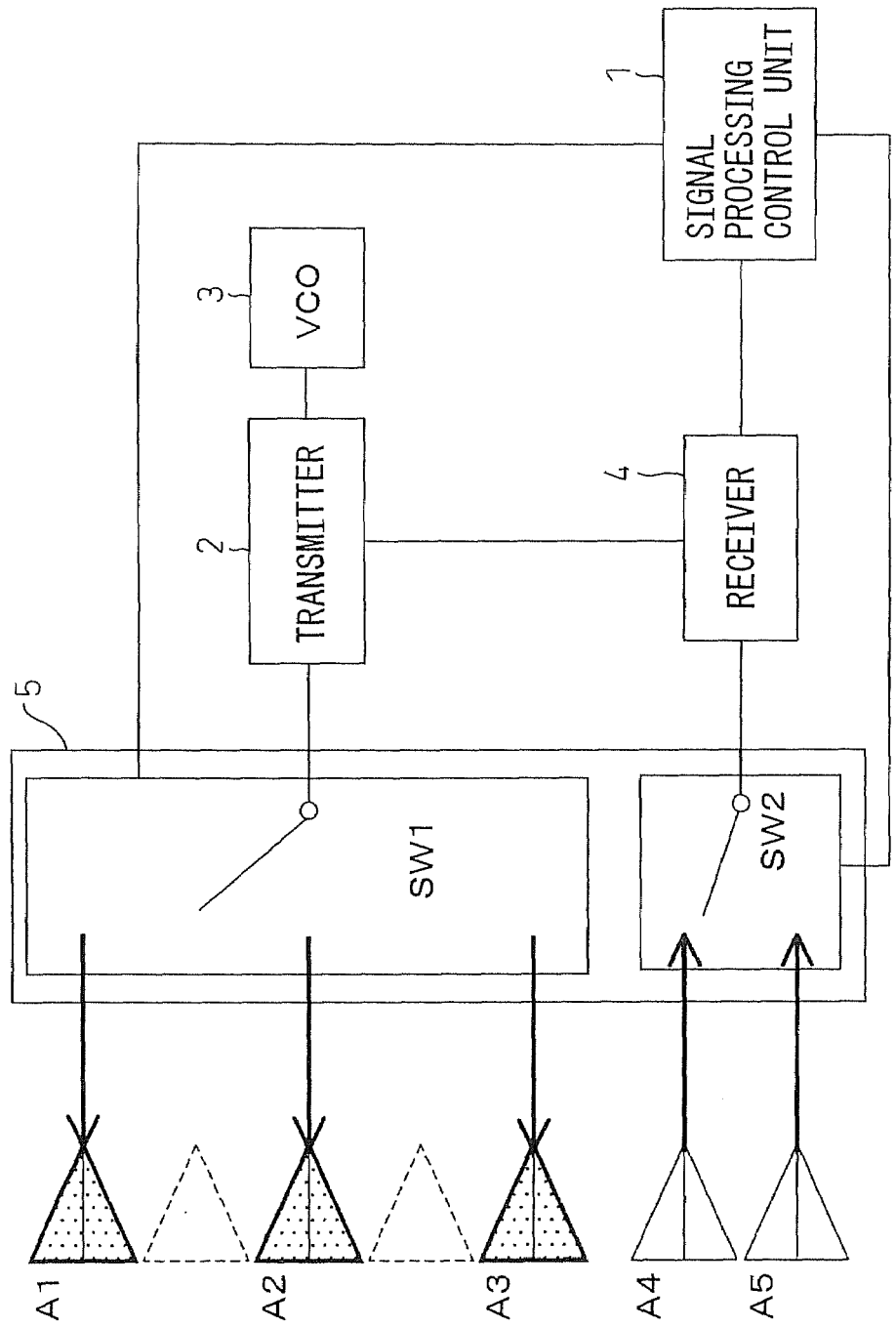
FIG. 19 is a schematic block diagram showing the configuration of a radar apparatus according to a previously proposed technique.

FIG. 19 is a schematic block diagram showing the configuration of the radar apparatus. In this radar apparatus, three transmitting antennas A1, A2, and A3 and receiving antennas A4 and A5 are connected to a switching means 5. A transmitter 2, which includes an oscillator 3 such as a voltage-controlled oscillator (VCO) that outputs a high-frequency signal, for example, in a 76-GHz band, and a receiver 4 are connected to the switching means 5. The receiver 4 sends the signal received from the receiving antenna to a signal processing control unit 1 in synchronism with the oscillator signal output from the oscillator 3. The signal processing control unit 1 performs signal processing for digital beam forming (DBF) based on the received signal, and also performs switching control for the transmitting antennas and receiving antennas via the switching means 5.

The oscillator 3 is connected via a distributor in the transmitter 2 to a switch SW1 on the transmitting side via which the oscillator output is supplied to the transmitting antennas. This switch SW1 is a single-pole three-throw (SP3T) switch whose outputs are connected to the three transmitting antennas A1, A2, and A3, respectively. By operating the switch SW1 under instruction from the signal processing control unit 1, the high-frequency signal from the oscillator 3 is supplied to the transmitting antennas A1, A2, and A3 in time division fashion. Thus, the high-frequency signal from the oscillator 3 is transmitted out from the transmitting antennas A1, A2, and A3, in sequence, in a time-division fashion. The transmitting antennas A1, A2, and A3 used here have the same directivity, i.e., the directivity that can radiate a radiowave over the entire detection region.

On the other hand, the two receiving antennas A4 and A5 are provided on the receiving side. A switch SW2 on the receiving side is connected to the receiving antennas A4 and A5. This switch SW2 is a single-pole double-throw (SPDT) switch whose outputs are connected to the receiving antennas A4 and A5. The single input of the switch SW2 is connected to a mixer in the receiver 4. By operating the switch SW2 under instruction from the signal processing control unit 1, the received signals obtained by the two receiving antennas A4 and A5 are selectively supplied to the receiver 4.

FIG. 20 shows how switching is made between the antennas in the radar apparatus shown in FIG. 19. In this radar apparatus, when the spacing between the receiving antennas A4 and A5 is denoted by L, the transmitting antennas A1, A2, and A3 are arranged and spaced apart by 2L.

The radiowaves transmitted from the transmitting antennas A1, A2, and A3 are reflected by a target object and received by the receiving antennas A4 and A5. Accordingly, when the transmitting antennas are moved in space, if the receiving antennas are translated correspondingly in the opposite direction, the same received signals should be obtained. Therefore, when the radiowave is transmitted from the transmitting antenna A2, the received signals at the receiving antennas A4 and A5 are the same as those received when the transmitting antenna A2 is moved to the position of the transmitting antenna A1 and the receiving antennas A4 and A5 are translated in the opposite direction by a distance equal to the spacing L between the receiving antennas A4 and A5. Likewise, when the radiowave is transmitted from the transmitting antenna A3, the received signals at the receiving antennas A4 and A5 are the same as those received when the transmitting antenna A3 is moved to the position of the transmitting antenna A1 and the receiving antennas A4 and A5 are translated by 2L.

FIG. 20 shows the pairing relationship between the transmitting and receiving antennas at each time instant and the positional relationship in the direction in which the antennas are arranged. It can be seen that, by appropriately operating the switches SW1 and SW2, beams of six channels can be obtained using a total of five antennas consisting of the three transmitting antennas and the two receiving antennas. This is equivalent to providing six receiving antennas for one transmitting antenna.

In another previously proposed radar apparatus, if six receiving antennas are to be provided for connection to one receiver, a two-stage switch configuration comprising two single-pole double-throw switches and one single-pole three-throw switch has had to be employed; by contrast, in the radar apparatus shown in FIG. 19, only a single-stage switch SW2 need be provided for switching between the receiving antennas A4 and A5, though the switch SW1 must be provided on the transmitting side.

Further, in the radar apparatus shown in FIG. 19, if it is desired to increase the number of channels in order to increase the directivity of the obtained beams, an additional receiving antenna A6 (not shown) having the same antenna characteristics as the receiving antennas A4 and A5 is provided so as to be spaced L apart from the others. In this case, the spacing between the respective transmitting antennas A1, A2, and A3 should be increased to 3L. According to a radar apparatus having such an antenna configuration, three channels are added to the channels shown in FIG. 20, and beams of nine channels can be obtained using a total of six antennas.

It is claimed that the above radar apparatus configuration makes the fabrication of the radar apparatus easier, can reduce the cost and, in applications such as automotive radar, can make the overall shape of the radar suitable for mounting on a vehicle. However, when such a radar apparatus is mounted, for example, on an automobile or the like, the position where it can be mounted is limited, and the available mounting space is quite restricted; therefore, the radar apparatus used in such applications must be made as small as possible. However, while the number of antennas can be reduced, the above radar apparatus still leaves much to be desired when it comes to size reduction; furthermore, from the standpoint of vehicle driving safety, it is needed to further increase the performance of the radar apparatus for recognizing targets ahead of the vehicle, and it is also desired to reduce the cost of the apparatus.

Figure 1:
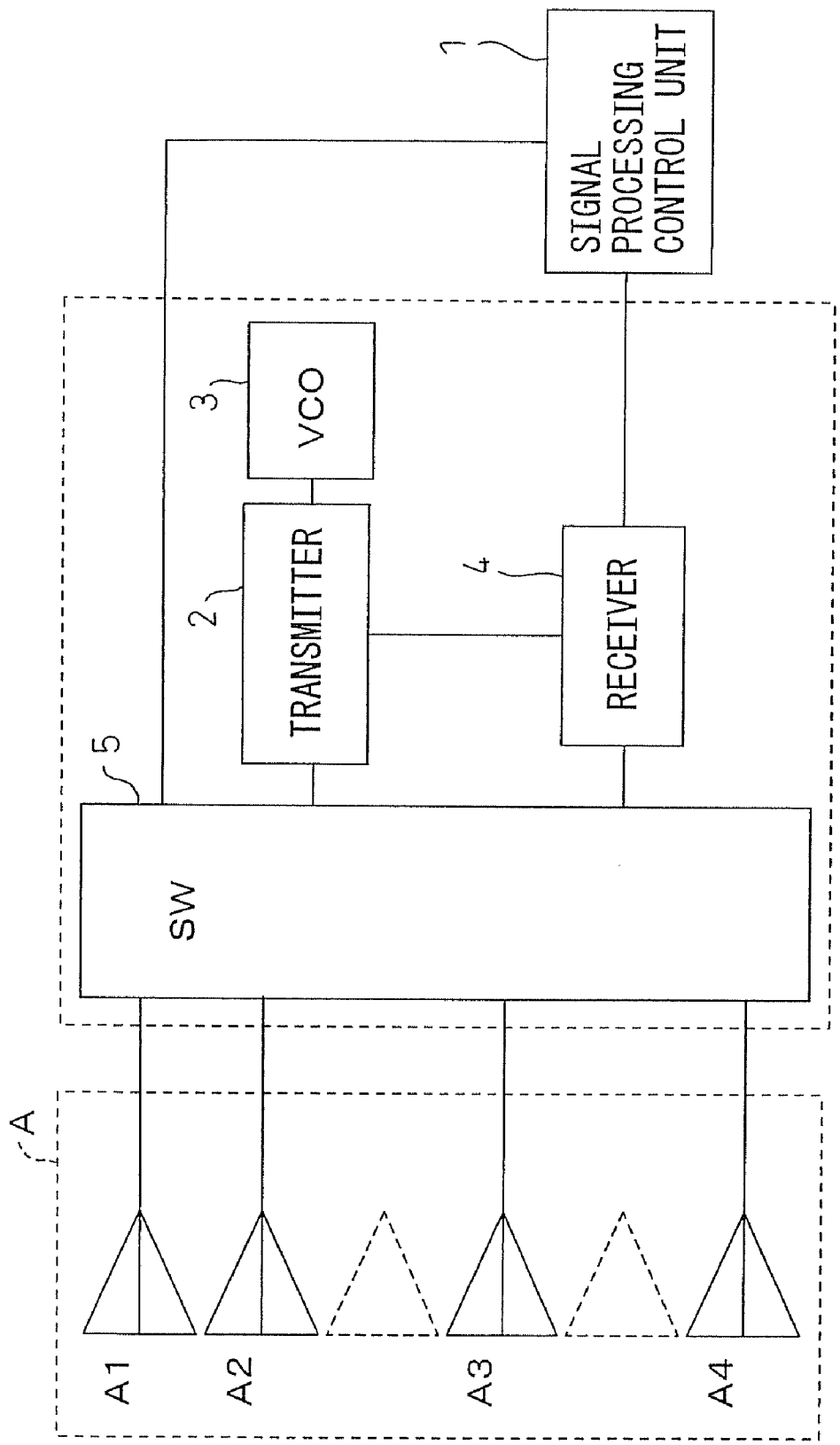
FIG. 1 is a schematic block diagram showing the configuration of a radar apparatus according to the present invention.

Next, embodiments of the radar apparatus that can achieve the earlier described object of the present invention will be described with reference to the accompanying drawings. FIG. 1 shows in simplified form the configuration of the radar apparatus according to the present invention. The radar apparatus shown here is basically the same as the previously proposed radar apparatus shown in FIG. 19 in that the scanning for receiving the reflected waves of the transmitted radiowave is performed by signal processing of digital beam forming (DBF). In the radar apparatus shown in FIG. 1, the same parts as those of the radar apparatus shown in FIG. 19 are designated by the same reference numerals. In the figure, the high-frequency circuit block within the dashed lines, which contains the transmitter 2, the voltage-controlled oscillator (VCO) 3, the receiver 4, and the switching means 5, is constructed from a monolithic microwave integrated circuit (MMIC), as in the prior art radar apparatus.

In the radar apparatus of FIG. 1, four antennas A1, A2, A3, and A4 form an antenna array A and are connected to the switching means 5. The transmitter 2, which includes the oscillator 3 such as a voltage-controlled oscillator (VCO) that outputs a high-frequency signal, for example, in a 76-GHz band, and the receiver 4, which receives a reflected signal representing a reflection of the transmitted radiowave signal output from the transmitter, are connected to the switching means 5. The receiver 4 is synchronized to the oscillator signal output from the oscillator 3, and sends the signal received from the receiving antenna to the signal processing control unit 1. The signal processing control unit 1 performs signal processing for digital beam forming (DBF) based on the received signal supplied from the receiver 4, and also performs switching control for the four antennas A1 to A4 via the switch SW in the switching means 5.

The major difference between the basic radar apparatus of FIG. 1 and the prior art radar apparatus is that, while, in the prior art radar apparatus, the transmitting antennas and the receiving antennas in the antenna array comprising the plurality of antennas are used only for transmission or reception, respectively, the plurality of antennas forming the antenna array A in the radar apparatus shown in FIG. 1 are not dedicated to transmission or reception but one or more or all of the plurality of antennas are used for both transmission and reception. The plurality of antennas are suitably switched by means of the switch SW between the transmission of the transmit signal supplied from the transmitter 2 and the reception of the reflected wave of the transmitted radiowave signal. The radiowave of the transmit signal is transmitted out from the sequentially selected antennas, and the reflected waves of the transmitted radiowave are received by the plurality of antennas, thus achieving scanning for multi-channel reception.

Further, the radar apparatus shown in FIG. 1 is characterized in that the plurality of antennas are arranged at unequally spaced intervals, rather than arranging them at equally spaced intervals as in the prior art radar apparatus. If the plurality of antennas were arranged at equally spaced intervals, the receiving position where each receiving antenna would receive the reflected wave of the radiowave transmitted from a selected one of the antennas would only be shifted by a distance equal to the antenna spacing. This would lessen the advantage of sequentially switching the transmitting antennas, and would make it difficult to increase the number of channels. In view of this, a wider antenna spacing and a narrower antenna spacing are provided, the wider spacing being twice as large as the narrower spacing. With this antenna arrangement, a larger number of channels can be obtained with fewer antennas.

The wider antenna spacing is not limited to twice the narrower spacing, but what is important is that the receiving position where each receiving antenna receives the reflected wave is shifted by a distance equal to the antenna spacing; by shifting a plurality of antennas, a larger number of channels can be obtained with fewer antennas. For example, the wider antenna spacing may be set at 1.5 times the narrower spacing. The following description is given by taking as an example the case in which the wider antenna spacing is set at twice the narrower spacing.

It is preferable that the plurality of antennas used in the radar apparatus shown in FIG. 1 have the same antenna characteristics in terms, for example, of directivity and gain. Further, each antenna should have such a directivity that it can radiate the radiowave over the entire detection region. It is also preferable that the antennas are arranged in a single row so that their transmitting and receiving surfaces are aligned in a straight line. If the antenna characteristics vary among the antennas, the amount of computation performed to detect the phases contained in the received signals will increase, which will affect the performance of the radar apparatus.

The radar apparatus shown in FIG. 1 is an example of the apparatus equipped with four antennas. The basic concept of digital beam forming (DBF) in this radar apparatus will be described with reference to FIGS. 2 and 3. DBF is performed in the signal processing control unit 1; here, each received signal from the array antenna array A comprising the plurality of antennas is A/D converted into a digital signal, and the adjustments of beam scanning and sidelobe characteristics, etc. are accomplished by digital signal processing.

Figure 2:
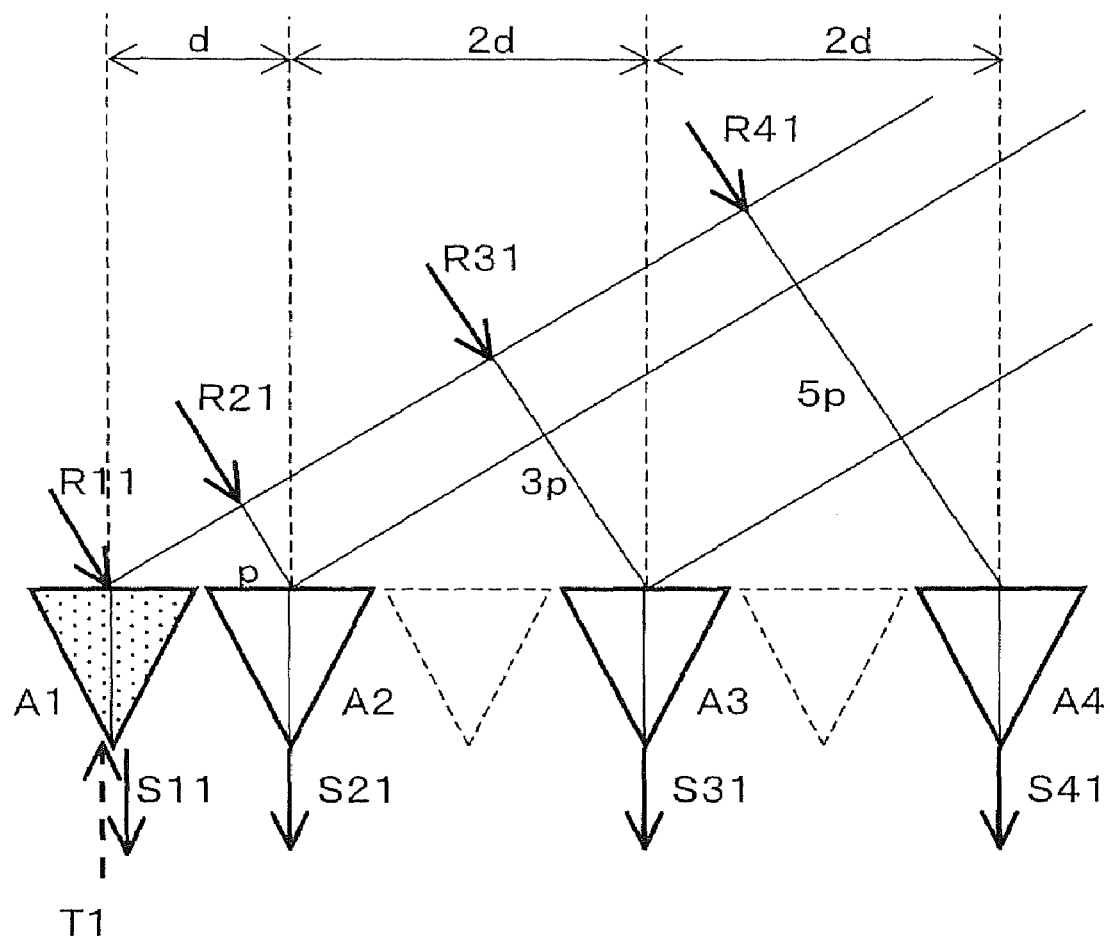
FIG. 2 is a diagram for explaining the operating principle of antennas in the radar apparatus according to the present invention.

FIG. 2 shows how the four antennas A1, A2, A3, and A4 in the radar apparatus are arranged horizontally in a row. In the figure, each antenna is represented by a triangle, and four antennas are arranged. When the spacing between the antennas A1 and A2 is denoted by d, the spacing between the antennas A2 and A3 and the spacing between the antennas A3 and A4 are each set at 2d which is twice the spacing d between the antennas A1 and A2. To make the spacing easier to view, dashed triangles are shown, one between the antennas A2 and A3 and the other between the antennas A3 and A4, to indicate that the respective antennas are spaced by a distance equal to one antenna, i.e., 2d.

First, suppose that a radiowave is transmitted as a transmitted signal T1 from the first selected antenna A1, as shown in FIG. 2. The shaded triangle in the figure indicates the transmitting antenna selected for transmitting the radiowave. The radiowave transmitted from the transmitting antenna A1 is reflected by a target object, and its reflected wave returns to the antenna array A. The radiowave arriving from the direction of angle θ relative to the center direction of the radar is received by the antenna array comprising the four antennas A1, A2, A3, and A4 arranged as shown in the figure. Compared with the propagation path length that the reflected wave R11 travels before arriving at the antenna A1, the reflected wave R21 arriving at the antenna A2, the reflected wave R31 arriving at the antenna A3, and the reflected wave R41 arriving at the antenna A4 travel farther by p, 3p, and 5p, respectively (where p=d sin θ) as shown in the figure.

This means that the reflected waves R21, R31, and R41 arriving at the antennas A2, A3, and A4 are retarded by the respective amounts from the reflected wave R11 arriving at the antenna A1. The amounts of retardation are $(2\pi d \cdot \sin \theta)/\lambda$, $(6\pi d \cdot \sin \theta)/\lambda$, and $(10\pi d \cdot \sin \theta)/\lambda$, respectively, where λ is the wavelength of the reflected wave.

When the reflected waves R11, R21, R31, and R41 are received by the respective antennas A1, A2, A3, and A4, the resulting received signals S11, S21, S31, and S41 are supplied to the receiver 4 via the switch SW. Since the arrival time of the reflected wave differs from one antenna to another, the phases of the respective received signals S21, S31, and S41 are retarded by $(2\pi d \cdot \sin \theta)/\lambda$, $(6\pi d \cdot \sin \theta)/\lambda$, and $(10\pi d \cdot \sin \theta)/\lambda$, respectively, from the phase of the received signal S11.

If the phase of each received signal is advanced by an amount equal to the amount of retardation of the received signal by the digital processing performed in the signal processing control unit 1, then the same result is obtained as when the reflected waves from the θ direction are received in phase by all the antennas, and the directivity of all the antennas is thus aligned in the θ direction.

Figure 3:
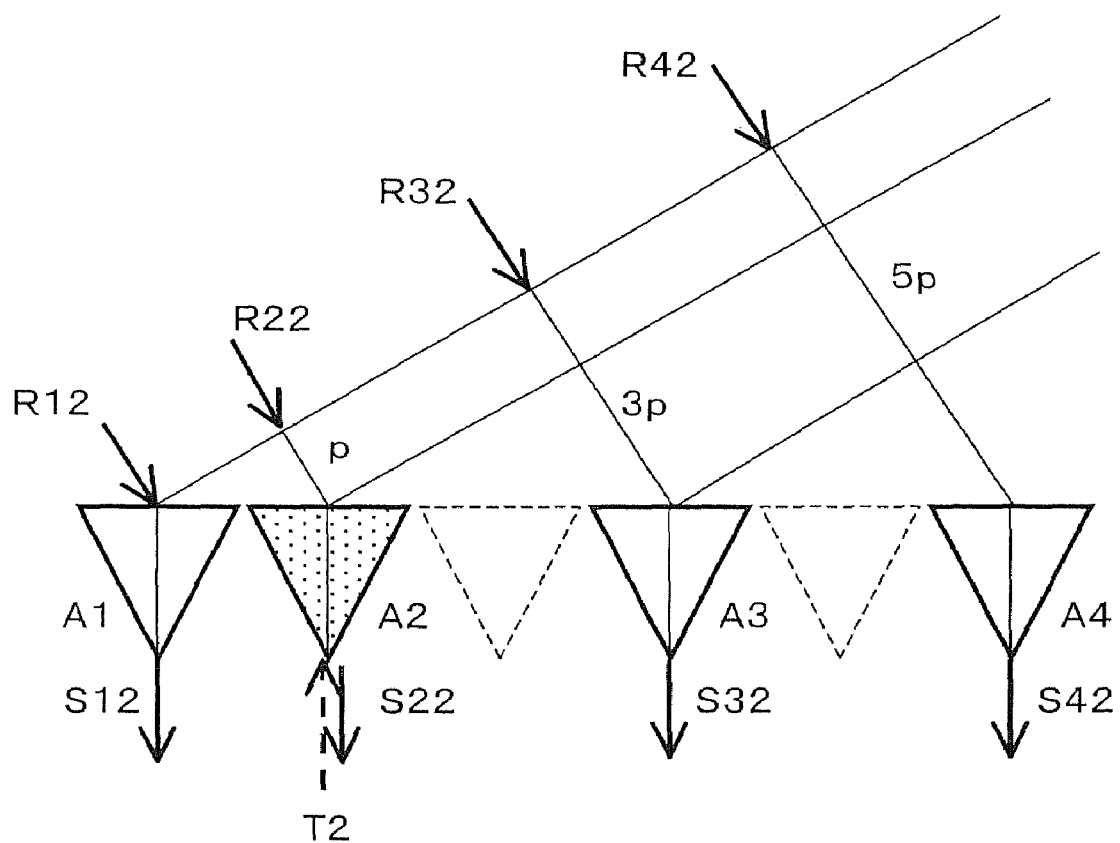
FIG. 3 is a diagram for explaining the receiving operations of the antennas in the radar apparatus according to the present invention.

Next, when the transmitting antenna is switched from the antenna A1 to the antenna A2, as shown in FIG. 3, a radiowave is transmitted as a transmitted signal T2 from the antenna A2. The radiowave transmitted from the transmitting antenna A2 is reflected by a target object, and its reflected wave returns to the antenna array A. As in FIG. 2, the reflected wave arriving from the direction of angle θ relative to the center direction of the radar is received by the antenna array comprising the four antennas A1, A2, A3, and A4.

The antennas A1, A2, A3, and A4 respectively receive the reflected waves R12, R22, R32, and R42 corresponding to the transmitted signal T2. When the reflected waves R12, R22, R32, and R42 are received by the respective antennas A1, A2, A3, and A4, the resulting received signals S12, S22, S32, and S42 are supplied to the receiver 4 via the switch SW. Here, compared with the propagation path length that the reflected wave R12 travels before arriving at the antenna A1, the reflected wave R22 arriving at the antenna A2, the reflected wave R32 arriving at the antenna A3, and the reflected wave R42 arriving at the antenna A4 travel farther by p (=d sin θ), 3p, and 5p, respectively, as shown in the figure.

However, unlike the case of FIG. 2, in the case of FIG. 3, as the transmitting antenna is shifted from the antenna A1 to the antenna A2, the arrival time of the reflected wave at the antenna A2 is set as the reference. As a result, compared with the case of FIG. 2, the arriving position of the reflected wave at each antenna is shifted in the horizontal direction by an amount equal to the amount of shift from the antenna A1 to the antenna A2.

Then, compared with the received signal S22 resulting from the reflected wave R22 received at the antenna A2, the phase of the received signal S12 from the antenna A1 is advanced by $(2\pi d \cdot \sin \theta)/\lambda$, while the phases of the received signals S32 and S42 resulting from the reflected waves R32 and R42 arriving at the respective antennas A3 and A4 are retarded from the phase of the received signal S22 received at the antenna A2. The amounts of retardation here are $(4\pi d \cdot \sin \theta)/\lambda$ and $(8\pi d \cdot \sin \theta)/\lambda$, respectively.

Accordingly, in the digital processing of each antenna received signal in the signal processing control unit 1, the received signal S12 having a phase lead is retarded in phase according to the amount of the phase lead. On the other hand, the received signals S32 and S42 each having a phase delay are advanced in phase according to the respective amounts of phase delay; then, the same result is obtained as when the arriving reflected waves are received in phase by all the antennas, and the directivity of all the antennas is thus aligned in the θ direction.

When an FM-CW wave is used as the transmitted signal, the FM-CW wave is transmitted by sequentially selecting the antennas A1, A2, A3, and A4 as the transmitting antenna for each period comprising increasing and decreasing triangular wave sections of the FM-CW wave by controlling the switch SW of the radar apparatus as described above. In each period, the reflected waves of the transmitted signal are received by the antennas A1, A2, A3, and A4. In this way, by transmitting the radiowave from a selected one of the four transmitting/receiving antennas and by receiving the reflected waves of the transmitted radiowave by the four antennas, eleven channels can be achieved with a space equivalent to six antennas.

Figure 4:
FIG. 4 is a time chart diagram for explaining a first specific example of antenna switching operation in the radar apparatus according to the present invention.
Figure 5:
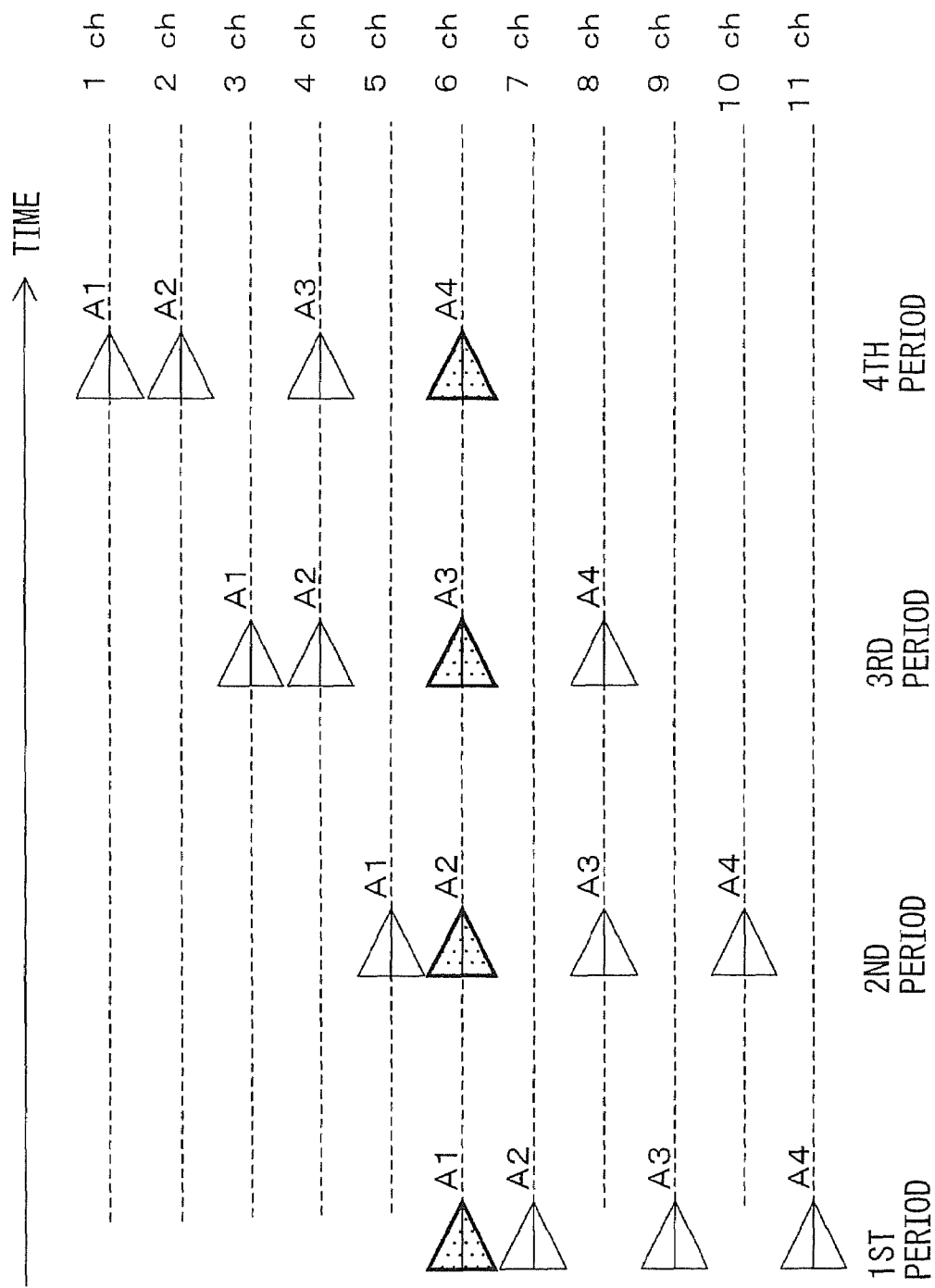
FIG. 5 is a diagram for explaining the formation of receiving channels in the first specific example of antenna switching operation.

FIGS. 4 and 5 show how the eleven receiving channels are achieved with a space equivalent to six antennas in the antenna array using the four antennas. FIG. 4 shows a first specific example of the antenna switching operation in the radar apparatus. The timing for switching between the transmitting antennas A1 to A4 and the receiving antennas A1 to A4 is shown in time series in conjunction with the triangular wave cycles of the transmitted FM-CW wave. In FIG. 4, receiving antenna 1 indicates each of the transmitting antennas A1 to A4 that was selected for transmission of the FM-CW wave and that, upon transmission, was switched to a receiving antennas for reception of the reflected wave. On the other hand, antenna 2 indicates each of the receiving antennas A1 to A4 that was switched to function as a receiving antenna other than the receiving antenna 1.

FIG. 5 shows how the receiving channels are formed, that is, the receiving signal channel switching sequence relating to antenna transmission and reception, in the first specific example of the antenna switching operation performed in accordance with the switching timing chart shown in FIG. 4. In FIG. 5, the horizontal axis represents the time, and triangles indicate receiving antennas, while shaded triangles indicate antennas used for both transmission and reception. The receiving channels for the respective antennas are shown by reference to the transmitting antenna for each period of the triangular FM-CW wave. In the illustrated example, each period consists of three triangular waves in the FM-CW wave shown in FIG. 4. Accordingly, the first to fourth periods together contain 12 triangular waves.

The spacing between the antennas A2 and A3 and the spacing between the antennas A3 and A4 are each set at twice the spacing between the antennas A1 and A2. Therefore, in the first period of the FM-CW wave, the antenna A1 receives the reflected wave on channel 6, the antenna A2 on channel 7, the antenna A3 on channel 9, and the antenna A4 on channel 11.

In the second period of the FM-CW wave, as the transmitting antenna is switched to the antenna A2, and the phase of the received signal at the antenna A2 is used as the reference, the arriving positions of the reflected waves at the respective antennas are apparently shifted from those in the first period by a distance equal to the spacing d. As a result, in the second period, the antenna A1 receives the reflected wave on channel 5, the antenna A2 on channel 6, the antenna A3 on channel 8, and the antenna A4 on channel 10.

In the next third period, the transmitting antenna is switch to the antenna A3, and in the fourth period, it is switched to the antenna A4. Therefore, in each of these periods, the arriving positions of the reflected waves at the respective antennas are apparently shifted from those in the preceding period by a distance equal to the spacing 2d. Accordingly, in the third and fourth periods, similarly to the first and second periods, the reflected waves are received at the respective antennas at the positions shifted by the spacing 2d. As a result, when viewed by reference to the antenna that transmitted the radiowave, this means that in the one switching cycle from the first period to the fourth period, the reflected waves of the transmitted wave have been received on all the channels from channel 1 to channel 11.

Here, duplicated reception occurs on the sixth channel, but this duplication is unavoidable because, in the case of FIG. 5, this channel is set as the reference channel. As for the duplicated reception on each of the fourth and eighth channels, on the other hand, either one of the received signals is not necessary. Here, if the computation burden is considered, provision may be made to not receive the redundant signal by controlling the switch SW, or to receive the redundant signal but not perform signal processing on the received signal.

Figure 6:
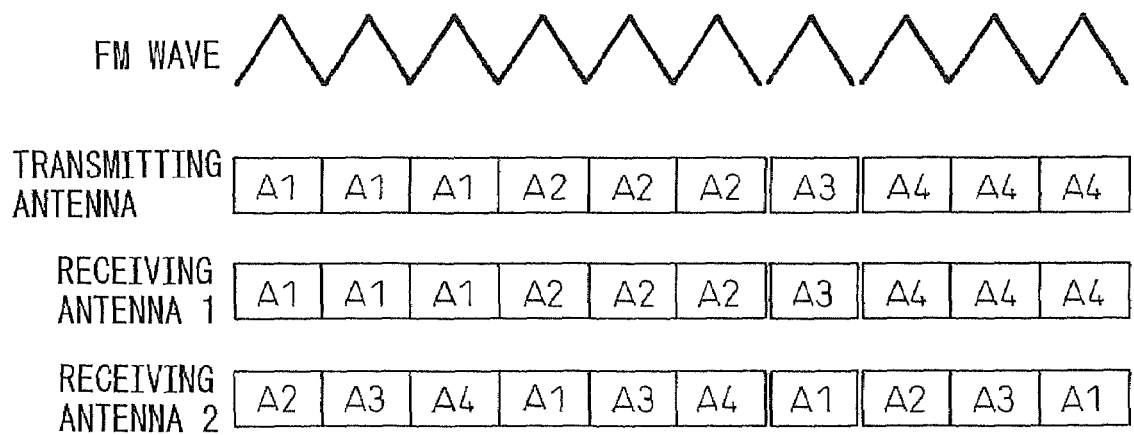
FIG. 6 is a time chart diagram for explaining a second specific example of antenna switching operation in the radar apparatus according to the present invention.
Figure 7:
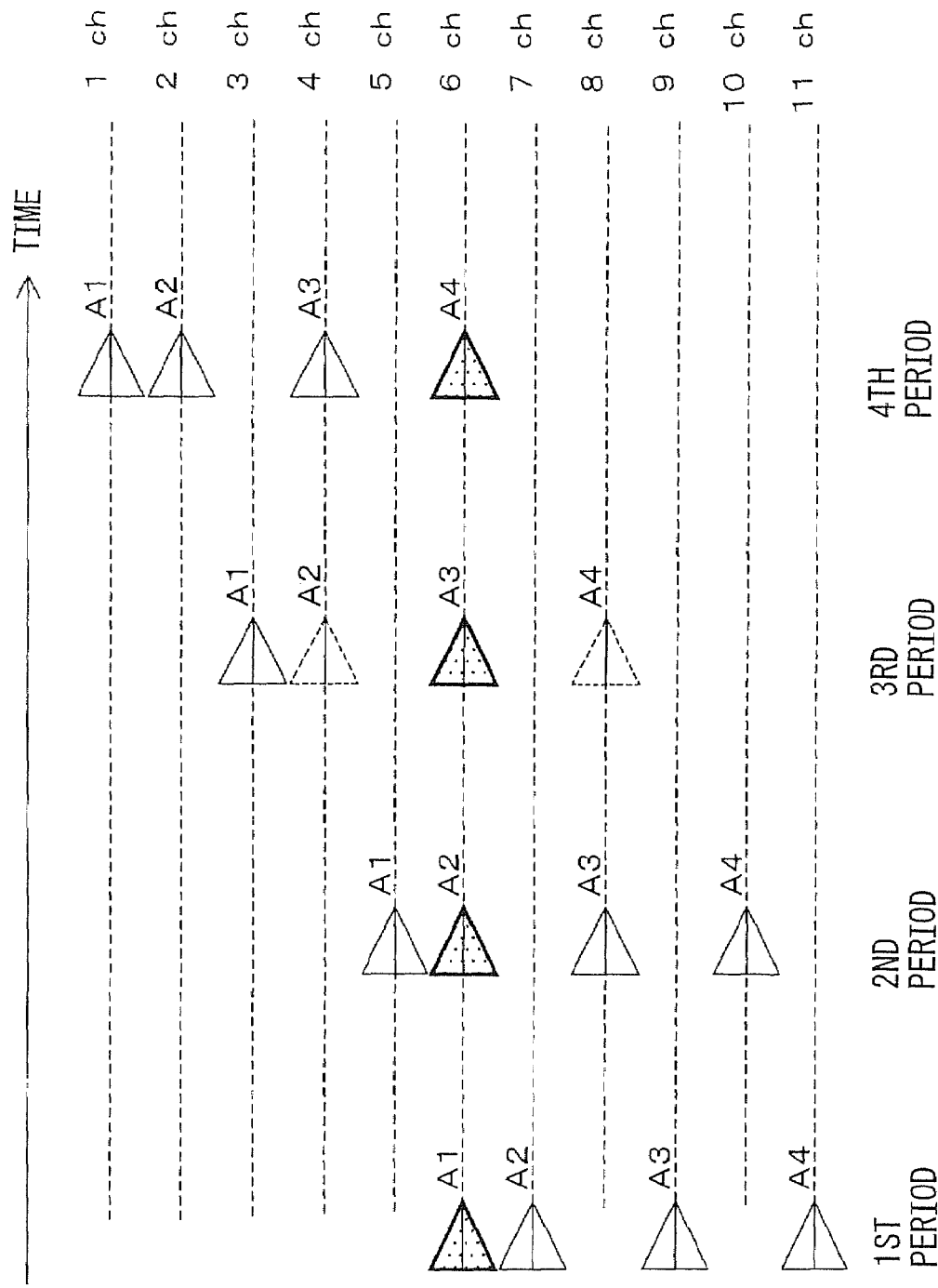
FIG. 7 is a diagram for explaining the formation of receiving channels in the second specific example of antenna switching operation.

The antenna switching operation that implements the above provision is shown as a second specific example in FIGS. 6 and 7. In FIG. 6, as in FIG. 4, the timing for switching between the transmitting antennas A1 to A4 and the receiving antennas A1 to A4 is shown in time series in conjunction with the triangular wave cycles of the transmitted FM-CW wave.

In FIG. 6, receiving antenna 1 indicates each of the transmitting antennas A1 to A4 that was selected for transmission of the FM-CW wave and that, upon transmission, was switched to a receiving antennas for reception of the reflected wave. On the other hand, antenna 2 indicates each of the receiving antennas A1 to A4 that was switched to function as a receiving antenna other than the receiving antenna 1.

FIG. 7 shows how the receiving channels are formed, that is, the receiving signal channel switching sequence relating to antenna transmission and reception, in the second specific example of the antenna switching operation performed in accordance with the switching timing chart shown in FIG. 6. In FIG. 7, as in FIG. 5, the horizontal axis represents the time, and triangles indicate receiving antennas, while shaded triangles indicate antennas used for both transmission and reception. The receiving channels for the respective antennas are shown by reference to the transmitting antenna for each period of the triangular FM-CW wave.

The receiving signal channel switching sequence relating to antenna transmission and reception in the second specific example differs from that in the first example in that, in the timing chart of FIG. 6, the antenna A3 is selected as the transmitting antenna only in one triangular wave cycle of the FM-CW wave and, in that cycle, only the antenna A1 is switched to function as the receiving antenna 2. On the other hand, as shown by dashed triangles in FIG. 7, neither the antenna A2 nor the antenna 4 is selected as the receiving antenna 2 in the third period.

This is because the antenna A3 has been selected as the receiving antenna 2 for the eighth channel in the second section, and also because the antenna 3 is scheduled to be selected for the fourth channel in the fourth section. In this way, duplication is avoided on the same channel. With this receiving signal channel switching sequence, eleven receiving channels are achieved with a space equivalent to six antennas in the radar apparatus equipped with the unequally spaced four antennas A1 to A4 as shown in FIG. 1. In the one switching cycle from the first section to the fourth section, multiple beams can be formed with ten triangular waves in the FM-CW wave, and thus the signal processing speed can be enhanced.

In the first and second specific examples, the receiving signal channel switching sequence has been described that achieves eleven channels with a space equivalent to six antennas in the radar apparatus equipped with the unequally spaced four antennas A1 to A4 as shown in FIG. 1; according to this receiving signal channel switching sequence, eleven receiving signal channels are always obtained in the operation of the radar apparatus, achieving reductions in the size and cost of the radar apparatus, and the directivity, when the received signals are combined, serving to enhance the performance of the radar apparatus.

Such a radar apparatus may be mounted, for example, on a vehicle and used to detect the azimuth to a target object located ahead. In such applications, there are cases where high azimuth detection performance is needed, and cases where the speed of azimuth detection is more critical than the performance itself. According to the radar apparatus shown in FIG. 1, eleven channels can be achieved with a space equivalent to six antennas, contributing to the reduction of the size and cost, but if eleven receiving channels are always obtained, the speed of azimuth detection required in certain situations may not be obtained.

Figure 8:
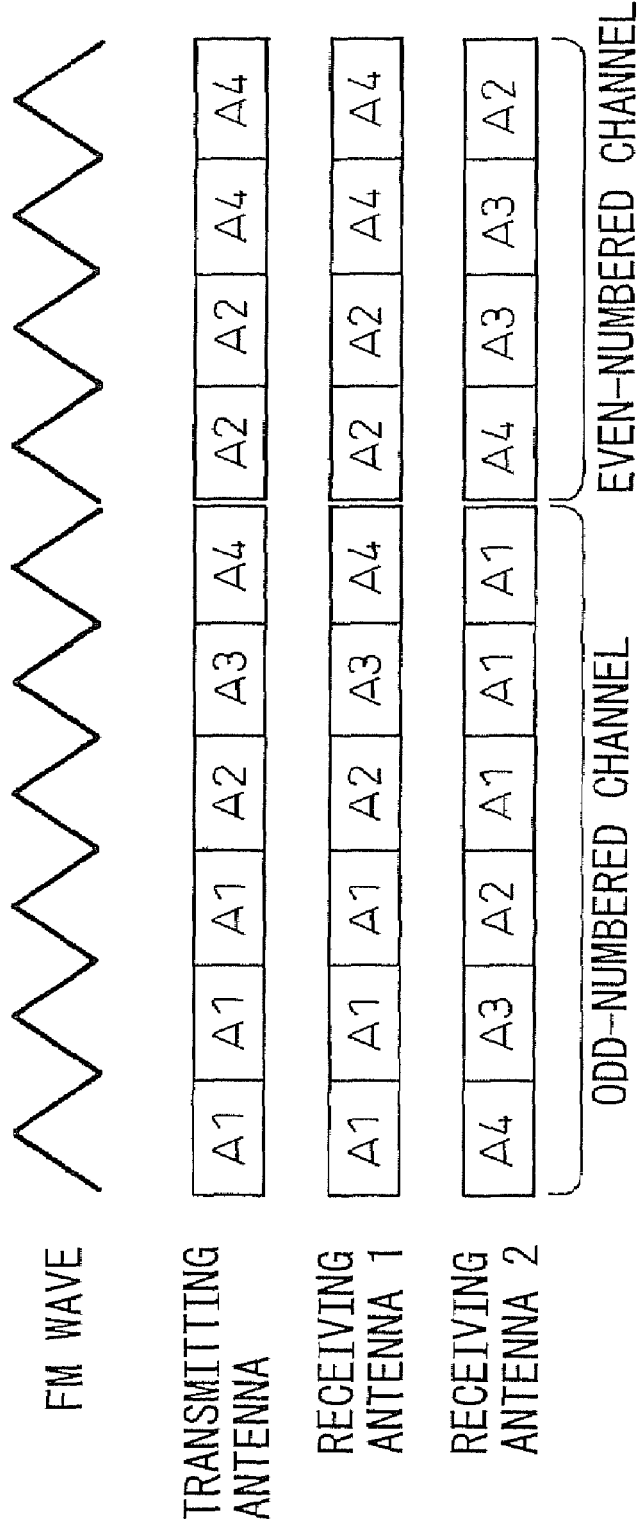
FIG. 8 is a time chart diagram for explaining a first embodiment of antenna switching operation in the radar apparatus according to the present invention.
Figure 9:
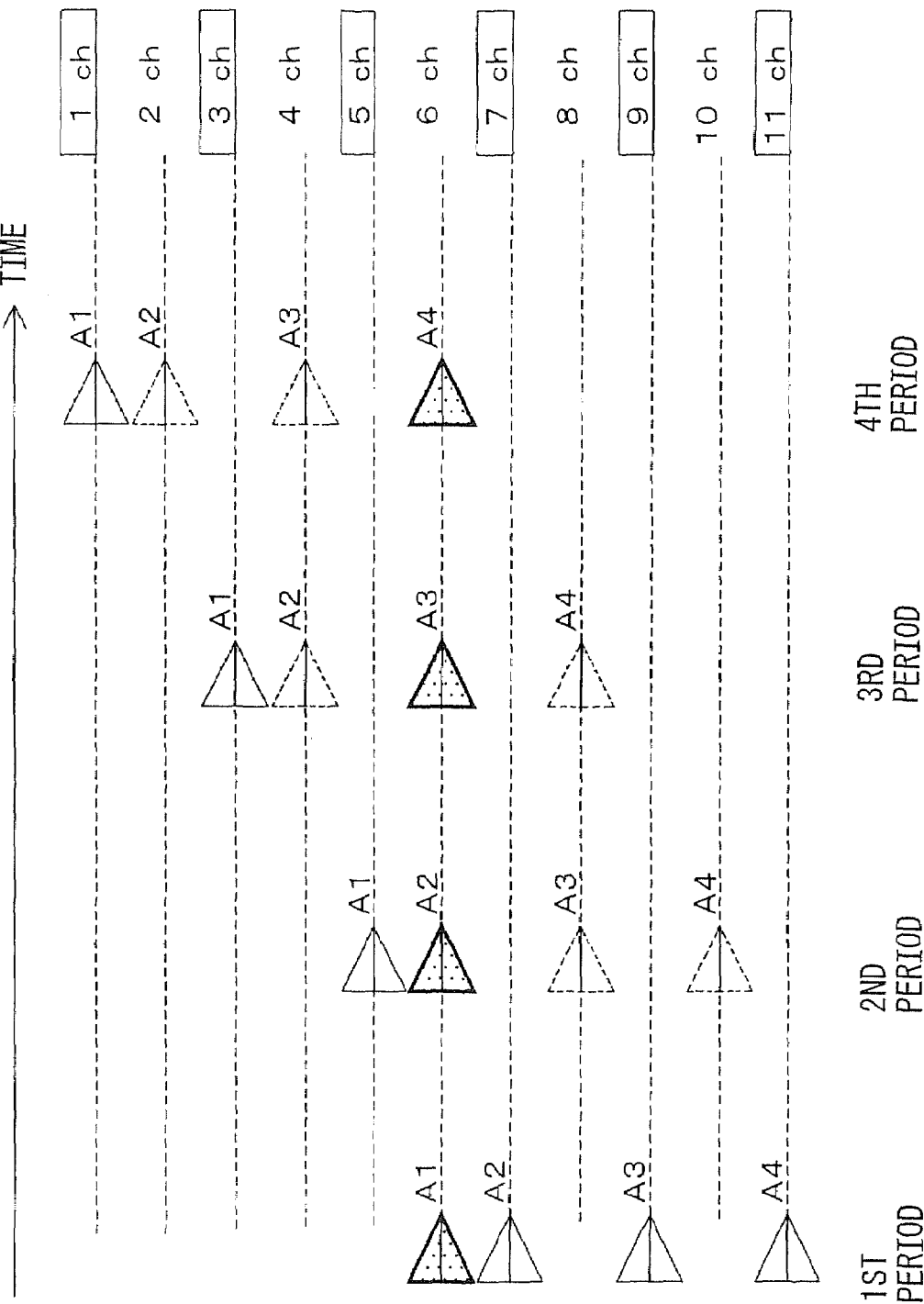
FIG. 9 is a diagram for explaining the formation of receiving channels in the first embodiment of antenna switching operation.

In view of this, the receiving signal channel switching sequence relating to antenna transmission and reception in the radar apparatus shown in FIG. 1 is modified so that the multi-channel formation can be switched between a coarse mode and a fine mode depending on the environment in which the radar is used for operation, and so that the mode can be switched from the fine mode to the coarse mode when a faster azimuth detection speed is needed. FIGS. 8 and 9 show a first embodiment of the antenna switching operation in the radar apparatus of the present invention.

In FIG. 8, as in FIG. 4, the timing for switching between the transmitting antennas A1 to A4 and the receiving antennas A1 to A4 is shown in time series in conjunction with the triangular wave cycles of the transmitted FM-CW wave. In FIG. 8 also, receiving antenna 1 indicates each of the transmitting antennas A1 to A4 that was selected for transmission of the FM-CW wave and that, upon transmission, was switched to a receiving antennas for reception of the reflected wave, and antenna 2 indicates each of the receiving antennas A1 to A4 that was switched to function as a receiving antenna other than the receiving antenna 1.

FIG. 9 shows how the receiving channels are formed, that is, the receiving signal channel switching sequence relating to antenna transmission and reception, in the first embodiment of the antenna switching operation performed in accordance with the switching timing chart shown in FIG. 8. In FIG. 9, as in FIG. 5, the horizontal axis represents the time, and triangles indicate receiving antennas, while shaded triangles indicate antennas used for both transmission and reception. The receiving channels for the respective antennas are shown by reference to the transmitting antenna for each period of the triangular FM-CW wave.

Unlike the earlier described first and second specific examples, in the first embodiment shown in FIGS. 8 and 9, the eleven receiving signal channels are not always formed, but the eleven channels to be formed are divided between a group of odd-numbered channels and a group of even-numbered channels. As shown in FIG. 8, of the plurality of contiguous triangular waves in the FM-CW wave having a length necessary to form the eleven receiving channels, the first half is allocated to the formation of the odd-numbered receiving channels and the second half to the formation of the even-numbered receiving channels in the receiving signal channel switching sequence. First, of the eleven channels, the formation of the odd-numbered receiving channels will be described. The first section shown in FIG. 9 contains the first three triangular wave cycles of the FM-CW wave shown in FIG. 8, and the second to fourth periods each contain the subsequent one triangular wave cycle. In the first period, the antenna A1 is selected as the transmitting antenna, and the three cycles of triangular waves are transmitted from the antenna A1, while the antennas A2, A3, and A4 are each selected as the receiving antenna 2 for each transmitting cycle. The antenna A2 receives the signal on the seventh channel, the antenna A3 receives the signal on the ninth channel, and the antenna A4 receives the signal on the 11th channel.

Next, in the second period, the antenna A2 is selected as the transmitting antenna, the antenna A1 is selected as the receiving antenna 2, and the antenna A1 receives the signal on the fifth channel. Then, in the third section, the antenna A3 is selected as the transmitting antenna, the antenna A1 is selected as the receiving antenna 2, and the antenna A1 receives the signal on the third channel. Further, in the fourth period, the antenna A4 is selected as the transmitting antenna, the antenna A1 is selected as the receiving antenna 2, and the antenna A1 receives the signal on the first channel. In FIG. 9, any antenna that is not selected as the antenna 2 and does not contribute to the formation of the odd-numbered receiving channels is shown by a dashed triangle.

As described above, of the eleven channels, the six odd-numbered receiving channels are formed with the six triangular wave cycles of the FM-CW wave. Next, a description will be given of how, of the eleven receiving channels, the even-numbered channels are formed with the four triangular waves that follow the above six triangular waves. As shown in FIG. 8, the even-numbered receiving channels are formed with the four triangular wave cycles in the second half, and in FIG. 9, the selection timing for each antenna selected as the receiving antenna 2 is shown by a dashed triangle.

As can be seen from FIG. 9, when forming the even-numbered receiving channels, the first period does not have any contribution but the second and fourth periods contribute to the formation of the receiving channels. The second section contains two cycles of triangular waves that follow the triangular waves used for the formation of the odd-numbered receiving channels, and the fourth period contains two cycles of triangular waves that follow the above two triangular wave cycles; with these four triangular wave cycles, the even-numbered receiving channels are formed.

First, in the second period, the antenna A2 is selected as the transmitting antenna, and two cycles of triangular waves are transmitted from the antenna A2, while the antennas A3 and A4 are each selected as the receiving antenna 2 for each transmitting cycle. The antenna A2 as the receiving antenna 1 receives the signal on the sixth channel, the antenna A3 as the receiving antenna 2 receives the signal on the eighth channel, and the antenna A4 receives the signal on the 10th channel. Then, in the fourth period, the antenna A4 is selected as the transmitting antenna, and two cycles of triangular waves are transmitted from the antenna A4, while the antennas A2 and A3 are each selected as the receiving antenna 2 for each transmitting cycle. The antenna A2 as the receiving antenna 2 receives the signal on the second channel, and the antenna A3 as the receiving antenna 2 receives the signal on the fourth channel.

As described above, of the eleven channels, the five even-numbered receiving channels are formed with the four triangular wave cycles of the FM-CW wave. Therefore, by performing the formation of the five even-numbered receiving channels immediately following the formation of the odd-numbered receiving channels earlier described, eleven receiving signal channels can be formed with ten triangular wave cycles.

As in the second specific example shown in FIGS. 6 and 7, not only the performance improvement due to the formation of the multiple channels, but the speedup of signal processing can also be achieved. Here, the formation of the six odd-numbered receiving channels earlier described may be performed immediately following the formation of the five even-numbered receiving channels described above; in that case also, eleven receiving signal channels can be formed with ten triangular wave cycles.

In applications where the radar apparatus is mounted, for example, on a vehicle such as an automobile and is used to detect the azimuth to a target object located ahead, accurate azimuth detection using all the channels is required in such situations as when the vehicle is running at a slow speed or on a congested road; on the other hand, in normal driving situations, it is required to increase the processing speed for azimuth detection. To address such requirements, when accurate azimuth detection is required, the receiving signal channel switching sequence is switched to the fine antenna transmission/reception mode, and multiple beams are formed using all the eleven channels by performing the receiving channel formation in accordance with the receiving signal channel switching sequence for the odd-numbered channels, immediately followed by the receiving channel formation in accordance with the receiving signal channel switching sequence for the even-numbered channels; in this way, the directivity of the radar apparatus can be enhanced and high resolution can be achieved.

On the other hand, in situations where accurate azimuth detection using all the channels is not required but it is required to increase the processing speed for azimuth detection, the receiving signal channel switching sequence is switched to the coarse mode which is not a high resolution mode, i.e., to the switching sequence for forming only the odd-numbered receiving channels, and multiple beams are formed using only six channels out of the eleven channels; in normal driving situations, this switching sequence is repeatedly performed to increase the processing speed for azimuth detection in the radar apparatus. In this way, the radar apparatus can be set up to match the using environment of the apparatus without changing the configuration of the apparatus but by just switching the receiving signal channel switching sequence relating to antenna transmission and reception to the appropriate mode.

Figure 10:
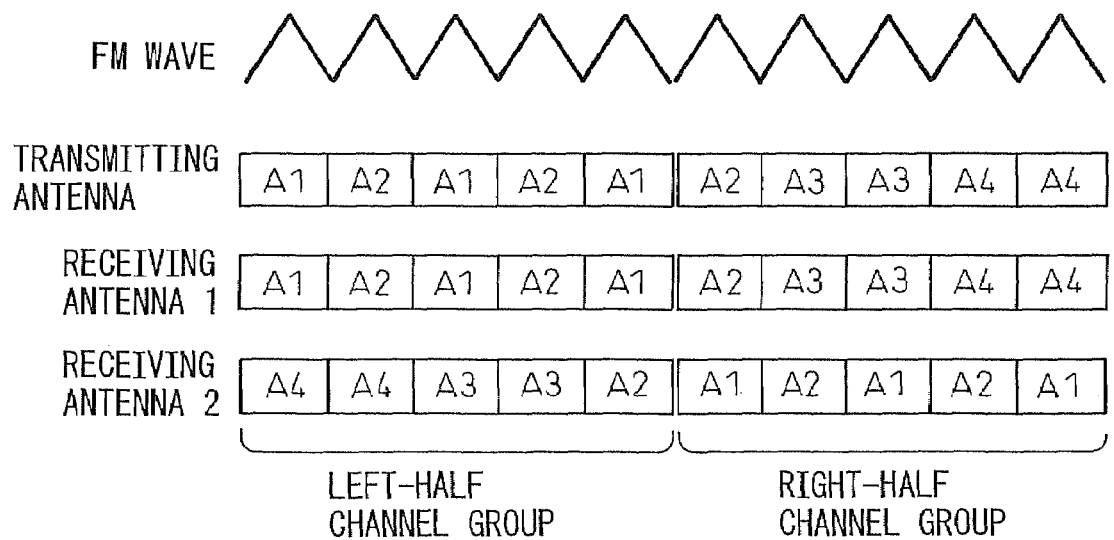
FIG. 10 is a time chart diagram for explaining a second embodiment of antenna switching operation in the radar apparatus according to the present invention.
Figure 11:
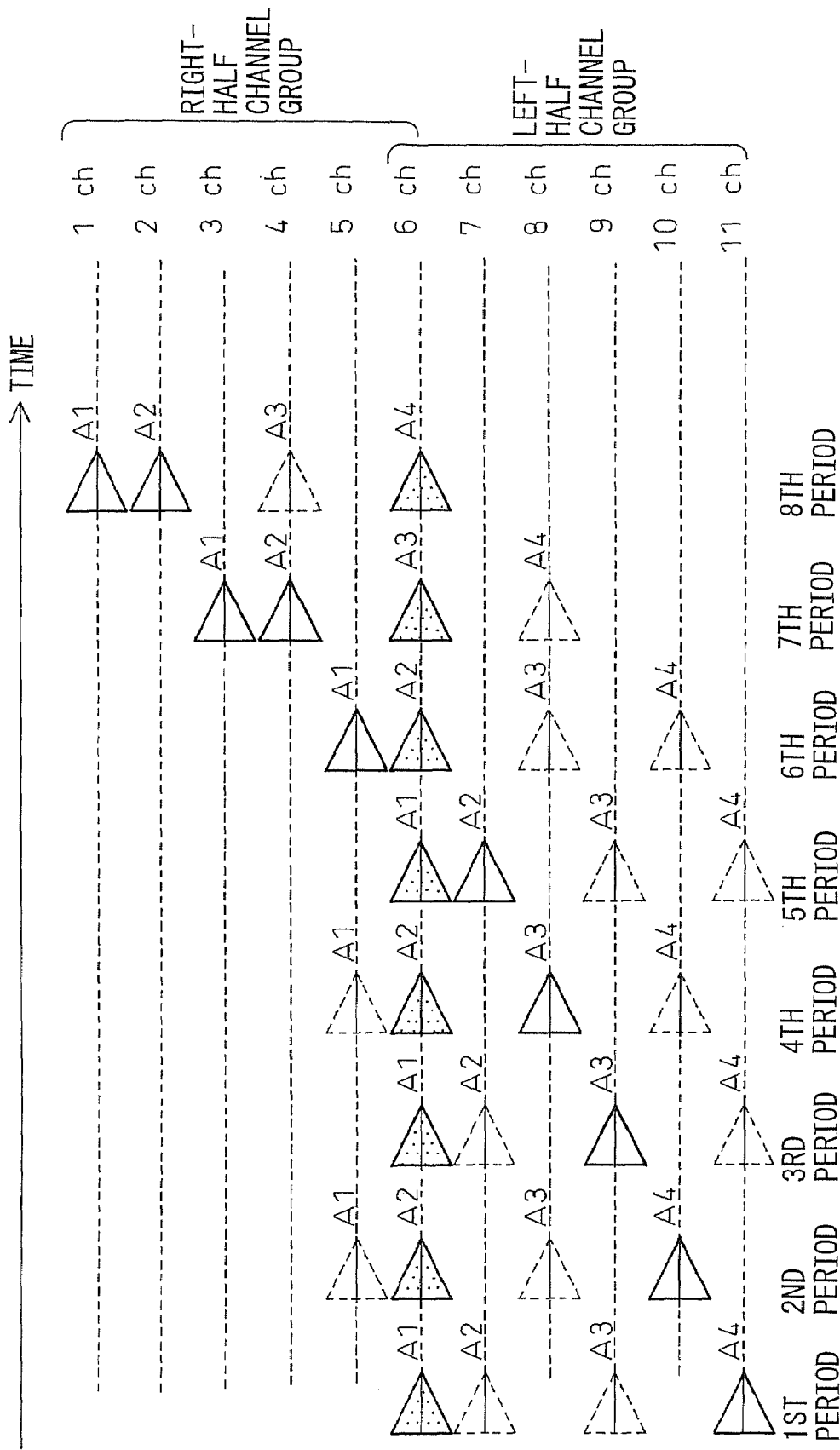
FIG. 11 is a diagram for explaining the formation of receiving channels in the second embodiment of antenna switching operation.

FIGS. 10 and 11 show a second embodiment in which the receiving signal channel switching sequence relating to antenna transmission and reception in the radar apparatus shown in FIG. 1 is modified so as to enhance the accuracy of azimuth detection; in this embodiment, the multiple receiving signal channels to be formed for the detection of a target object located ahead of the radar apparatus are divided into two groups, the left group and the right group, and multiple beams are formed using the plurality of channels in the left half and the plurality of channels in the right half, respectively, so that the processing for azimuth detection can be performed twice.

In FIG. 10, as in FIG. 4, the timing for switching between the transmitting antennas A1 to A4 and the receiving antennas A1 to A4 is shown in time series in conjunction with the triangular wave cycles of the transmitted FM-CW wave. In FIG. 10 also, receiving antenna 1 indicates each of the transmitting antennas A1 to A4 that was selected for transmission of the FM-CW wave and that, upon transmission, was switched to a receiving antennas for reception of the reflected wave, and antenna 2 indicates each of the receiving antennas A1 to A4 that was switched to function as a receiving antenna other than the receiving antenna 1.

FIG. 11 shows how the receiving channels are formed, that is, the receiving signal channel switching sequence relating to antenna transmission and reception, in the second embodiment of the antenna switching operation performed in accordance with the switching timing chart shown in FIG. 10. In FIG. 11, as in FIG. 5, the horizontal axis represents the time, and triangles indicate receiving antennas, while shaded triangles indicate antennas used for both transmission and reception. The receiving channels for the respective antennas are shown by reference to the transmitting antenna for each section of the triangular FM-CW wave. In the example shown in FIG. 11, the left-half channel group is the group consisting of the sixth to 11th channels, and the right-half channel group is the group consisting of the first to sixth channels.

Unlike the earlier described first and second specific examples, in the second embodiment shown in FIGS. 10 and 11, the eleven receiving signal channels are not always formed, but the eleven channels to be formed are divided into the left-half and right-half groups each consisting of a plurality of channels. As shown in FIG. 10, of the plurality of contiguous triangular waves in the FM-CW wave having a length necessary to form the eleven receiving channels, the first half is allocated to the formation of the receiving channels in the left-half group and the second half to the formation of the receiving channels in the right-half group in the receiving signal channel switching sequence. Here, the sixth channel which is set as the reference receiving signal channel is included in both the left-half and right-half receiving channel groups. Further, to enhance the resolution of the azimuth detection performed using the plurality of channels in the left half and the right half, an additional channel or channels may be included in each of the left-half and right-half receiving channel groups so that each group consists of seven or more channels.

First, of the eleven channels, the formation of the receiving channels in the left half will be described. The first to sixth periods shown in FIG. 9 each contain one triangular wave cycle of the FM-CW wave shown in FIG. 10, and the seventh and eighth periods each contain two triangular wave cycles of the FM-CW wave shown in FIG. 10, that is, a total of eight periods are provided to form the eleven channels. In the first period, the antenna A1 is selected as the transmitting antenna, and one cycle of triangular wave is transmitted from the antenna A1, while the antenna A1 is selected as the receiving antenna 1 and the antenna A4 as the antenna 2. The antennas A1 and A4 receive the signals on the sixth and 11th channels, respectively.

Next, in the second period, the antenna A2 is selected as the transmitting antenna, while the antenna A2 is selected as the receiving antenna 1 and the antenna A4 as the receiving antenna 2, to receive the signals on the sixth and 10th channels, respectively. In the subsequent third to sixth sections, the antennas A1 and A2 are alternately selected as the transmitting antenna, while the antennas A1 and A2 are alternately selected as the receiving antenna 1, and the antenna A2 or A3 corresponding to one of the ninth to seventh channels is selected as the receiving antenna 2. With this switching sequence, the reference channel signal is received, and the signals on the ninth to seventh channels are sequentially received.

In the left-half receiving signal channel switching sequence performed in accordance with the antenna selection procedure described above, multiple beams can be formed with the six receiving signal channels consisting of the sixth to 11th channels. The signal processing means performs processing for azimuth detection based on the multiple beams formed with the left-half six channels.

Next, the formation of the receiving channels in the right half will be described. In the sixth section, the antenna A2 is selected as the transmitting antenna, and one cycle of triangular wave is transmitted from the antenna A2, while the antenna A2 is selected as the receiving antenna 1 and the antenna A1 as the antenna 2. The antennas A2 and A1 receive the signals on the sixth and fifth channels, respectively.

In the seventh period, the antenna A3 is selected as the transmitting antenna, and two cycles of triangular waves are sequentially transmitted from the antenna A3, while the antenna A3 is selected as the receiving antenna 1 and the antennas A2 and A1 are sequentially selected as the antenna 2. The antennas A2 and A1 receive the signals on the fourth and third channels, respectively.

Next, in the eighth period, the antenna A4 is selected as the transmitting antenna, and two cycles of triangular waves are sequentially transmitted from the antenna A3, while the antenna A4 is selected as the receiving antenna 1, and the antennas A2 and A1 are sequentially selected as the antenna 2 and receive the signals on the second and first channels, respectively. In FIG. 11, any antenna that is not selected as the antenna 2 and does not contribute to the formation of the receiving channels is shown by a dashed triangle.

In the right-half receiving signal channel switching sequence performed in accordance with the antenna selection procedure described above, multiple beams can be formed with the six receiving signal channels consisting of the first to sixth channels. The signal processing means performs processing for azimuth detection based on the multiple beams formed with the left-half six channels.

As described above, of the eleven channels, six receiving signal channels in each of the left-half and right-half groups are formed with five triangular wave cycles of the FM-CW wave. Accordingly, the signal processing means can perform the processing for azimuth detection for the left-half and right-half groups separately, based on the signals received on the six channels in the respective groups.

By performing the azimuth detection once for every five triangular wave cycles of the FM-CW wave as described above, the processing speed for azimuth detection can be increased, as in the case of the receiving channel formation for the odd-numbered channels in the first embodiment. Furthermore, as the processing for azimuth detection can be performed once again by using the next five triangular wave cycles of the FM-CW wave, which means repeating the azimuth detection of the same resolution twice, the accuracy of the azimuth detection can be enhanced.

In the radar apparatus shown in FIG. 1, the four antennas are sequentially switched by the switching means 5 into operation as the transmitting antenna, starting from one end of the antenna array, but if the antennas are sequentially selected starting from an antenna located halfway along the antenna array, not from one end of the antenna array, the eleven channels can be formed in the same manner as when the antennas are sequentially selected starting from one end of the array.

In the examples so far described, all of the four antennas have been sequentially selected as the transmitting antenna to achieve the eleven channels, but there are situations where such high beam directivity is not needed. For example, consider the case where the radar apparatus is mounted on a vehicle; in this case, if the vehicle speed is so fast that the computing speed of the radar apparatus cannot keep up with the vehicle speed, and if the distance to the target object is closing, it may become necessary to reduce the amount of computation and increase the computing speed.

To address such situations, only five channels may be obtained by sequentially selecting, for example, the antennas A1 and A2 as the transmitting antenna rather than sequentially selecting all of the four antennas as the transmitting antenna in the radar apparatus, or alternatively, nine channels may be obtained by sequentially selecting the antennas A1, A2, and A3 as the transmitting antenna. In this way, by choosing an appropriate set of antennas for selection as the transmission antenna, the number of channels to be formed can be changed without changing the four-antenna configuration but by just controlling the switching operation of the switch SW.

The embodiments of the radar apparatus described above have dealt with the case where the apparatus has four transmit/receive common antennas, but in order to obtain a suitable number of channels, all the four antennas need not necessarily be used for both transmission and reception, but two or three of the four antennas may be used for both transmission and reception. On the other hand, if it is desired to significantly increase the number of channels, an antenna A5 (not shown) may be added at a position spaced apart by 2d.

Further, in each of the embodiments of the radar apparatus described above, the apparatus has four transmit/receive common antennas, and digital beams of eleven channels are formed using a space equivalent to six antennas. Here, if the number of antennas is reduced to three, the object of the invention to form digital beams having a larger number of channels with a fewer number of antennas can be achieved. When the number of antennas is three, the maximum number of channels that can be generated is seven. In this case, the apparatus size can be made smaller than the prior art DBF radar with nine channels, though the resolution drops.

On the other hand, if the number of antennas is increased to five or more, the resolution increases, but it becomes correspondingly difficult to achieve size and cost reductions. Accordingly, when the number of antennas is four, digital beams can be formed with a maximum of eleven channels that can be generated, and not only does it become possible to achieve a resolution higher than that of the antennas in the prior art DBF radar apparatus, but the apparatus size can be reduced while also reducing the cost of the apparatus.

It can therefore be said that the four-antenna configuration is the best choice for the formation of multi-channel digital beams. In this way, when four antennas are provided, the number of channels to be generated can be reduced to form digital beams with fewer than eleven channels in order, for example, to address situations where the speed of azimuth detection is more critical than the detection accuracy. For example, the number of channels can be reduced to nine to reduce the resolution to the level comparable to that of the prior art DBF radar apparatus. Accordingly, the four antennas of the radar apparatus of the present invention preserve compatibility with the antennas of the prior art DBF radar apparatus.

As described above, in the configuration of the radar apparatus shown in FIG. 1, of the plurality of antennas arranged in a straight line on the same plane, the radiowave is transmitted from at least one selected antenna, and the reflected waves of the transmitted radiowave are received by the respective antennas; accordingly, not only can a larger number of channels be obtained with fewer antennas than that in conventional radar apparatuses, but also the size and cost of the radar apparatus can be reduced. In particular, when all of the plurality of antennas are used for both transmission and reception, the number of channels can be greatly increased, and the directivity when the received signals are combined can be increased, serving to enhance the performance of the radar apparatus.

Next, modified examples of the above embodiments will be described with reference to FIGS. 12 to 18; the modified examples shown below are based on the configuration of the radar apparatus of the present invention shown in FIG. 1, and concern the configurations for improving the efficiency, reducing the cost, or achieving further reduction in size in accordance with the receiving signal channel switching sequences of the first and second embodiments.

Figure 12:
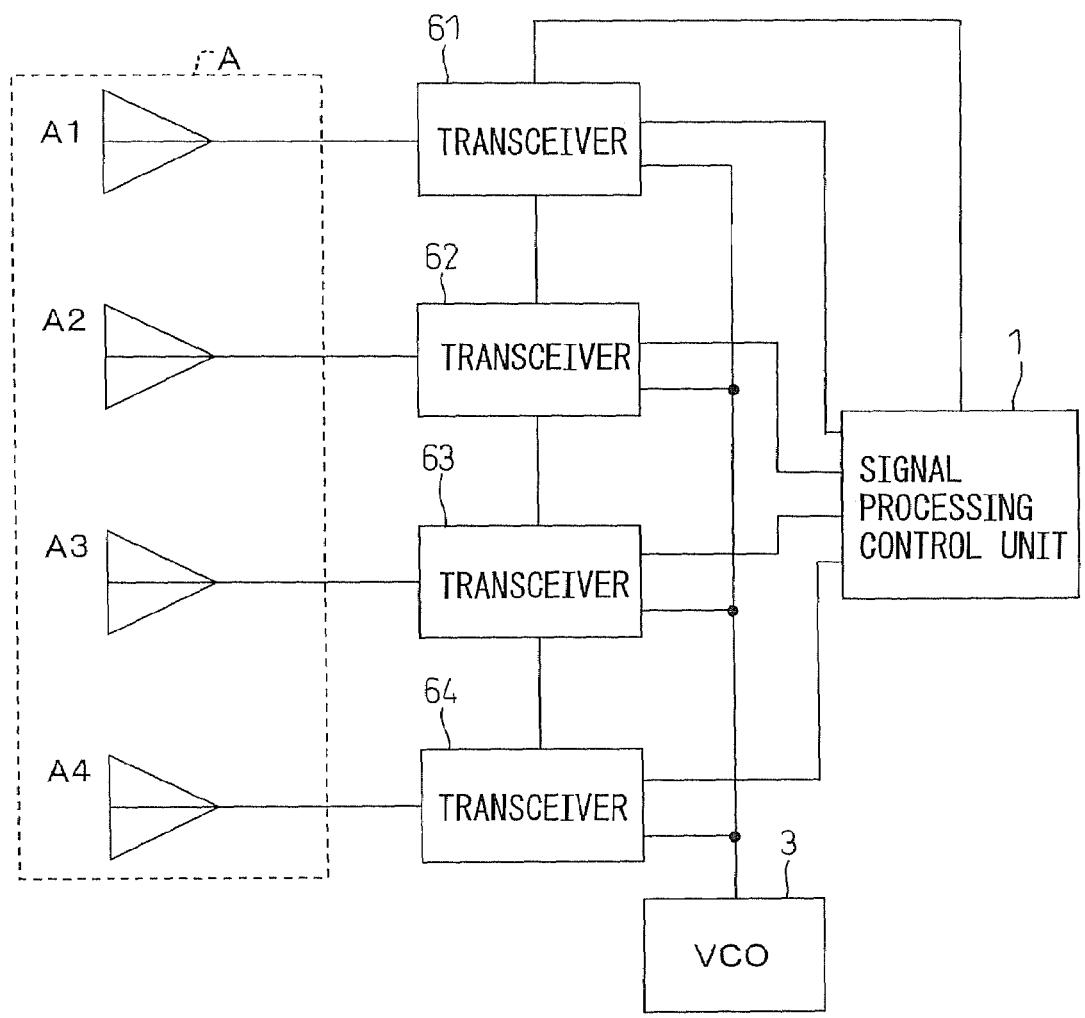
FIG. 12 is a diagram for explaining a first modified example of antenna transmission/reception configuration in the radar apparatus according to the present invention.

In a first modified example shown in FIG. 12, the switching means 5 is omitted, and transceivers 61, 62, 63, and 64, each serving as both the transmitter 2 and the receiver 4, are respectively connected to the four antennas A1, A2, A3, and A4. This configuration is effective in applications where it is required to prevent signal attenuation even if the cost increases. A voltage-controlled oscillator (VCO) for generating the transmit signal may be provided at each transceiver, but in the illustrated example, a single voltage-controlled oscillator 3 is provided common to all the transceivers to share the same transmit signal source among them and to facilitate the synchronization of receiving operations, while achieving a reduction in cost. A duplexer means for switching each antenna between transmission and reception can be constructed, for example, from a hybrid circuit or a distribution circuit; further, an amplifier (AMP) and an attenuator (ATT) may be inserted at the transmitting and receiving sides so that the transmission and reception can be turned on and off by controlling the gain or the amount of attenuation. In this way, each antenna can be switched between transmission and reception in time division fashion.

Figure 13:
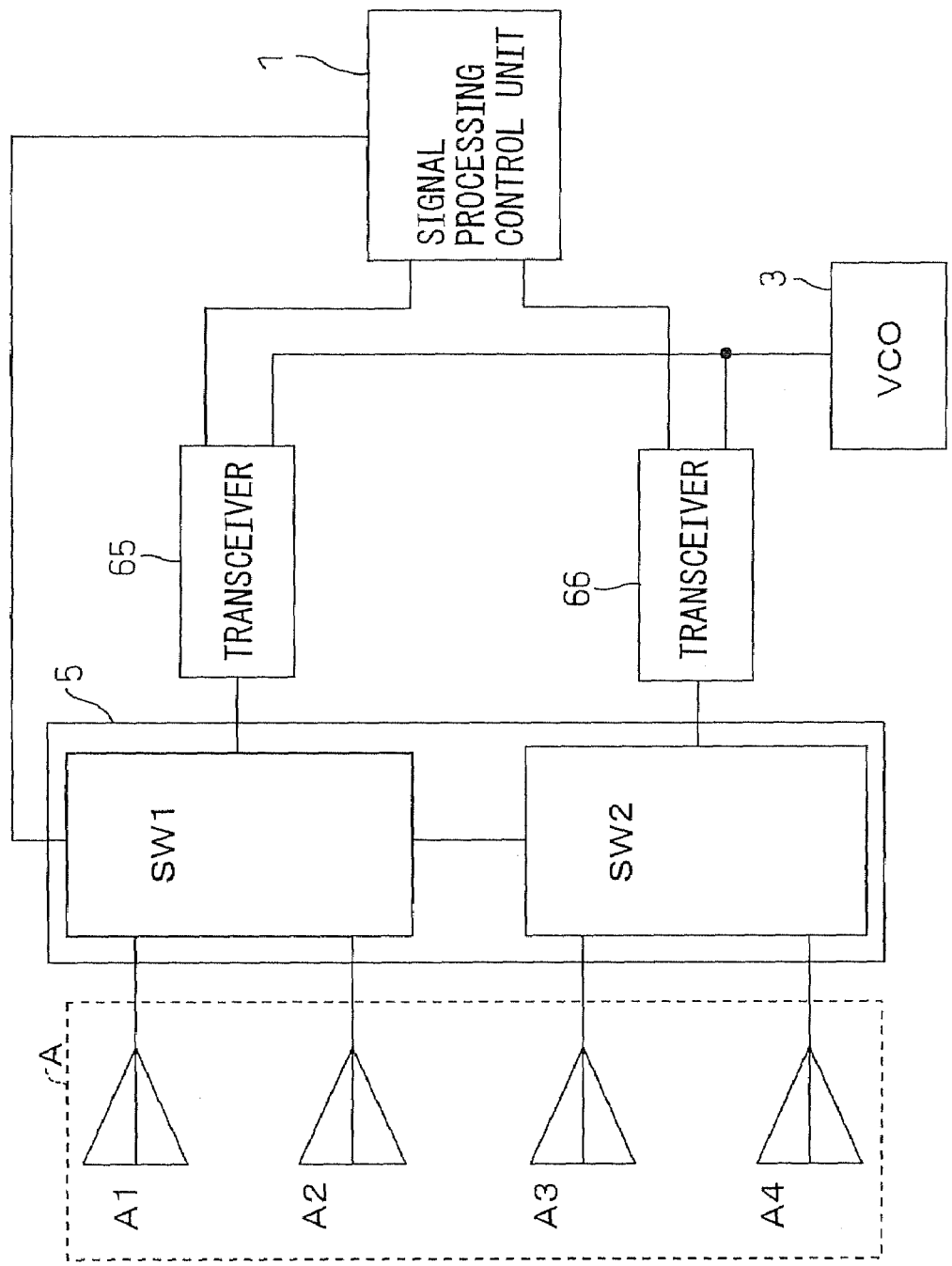
FIG. 13 is a diagram for explaining a second modified example of antenna transmission/reception configuration in the radar apparatus according to the present invention.

A second modified example shown in FIG. 13 employs a configuration intermediate between the configuration shown in FIG. 1 and the configuration shown in FIG. 12, and aims at reducing the signal attenuation to a relatively low level while also reducing the cost increase due to the addition of the transceivers. To this end, rather than omitting the switching means 5 as in the example of FIG. 12, the configuration of FIG. 13 employs single-pole double-throw (SPDT) switches each for switching between two antennas, and the switches SW1 and SW2 are controlled by the signal processing control unit 1 to switch between the four antennas. In this case also, the voltage-controlled oscillator is provided common to the transceivers 65 and 66.

The above has described the modified examples of the embodiments concerning the configuration relating to the transmitter and receiver; now, specific examples of the switching means 5 in the radar apparatus of FIG. 1 will be described below. The figures given hereinafter focus on the configuration of the switching means 5, and therefore, the signal processing control unit 1 and the voltage-controlled oscillator 3 which are essential to the radar apparatus are not shown. The four antennas A1, A2, A3 and A4 forming the antenna array A, the transmitter 2, and the receiver 4 are connected to the switching means 5, and the switching operation of the switch SW is controlled by the signal processing control unit 1 so that the four antennas are switched between transmission and reception in time division fashion.

Figure 14:
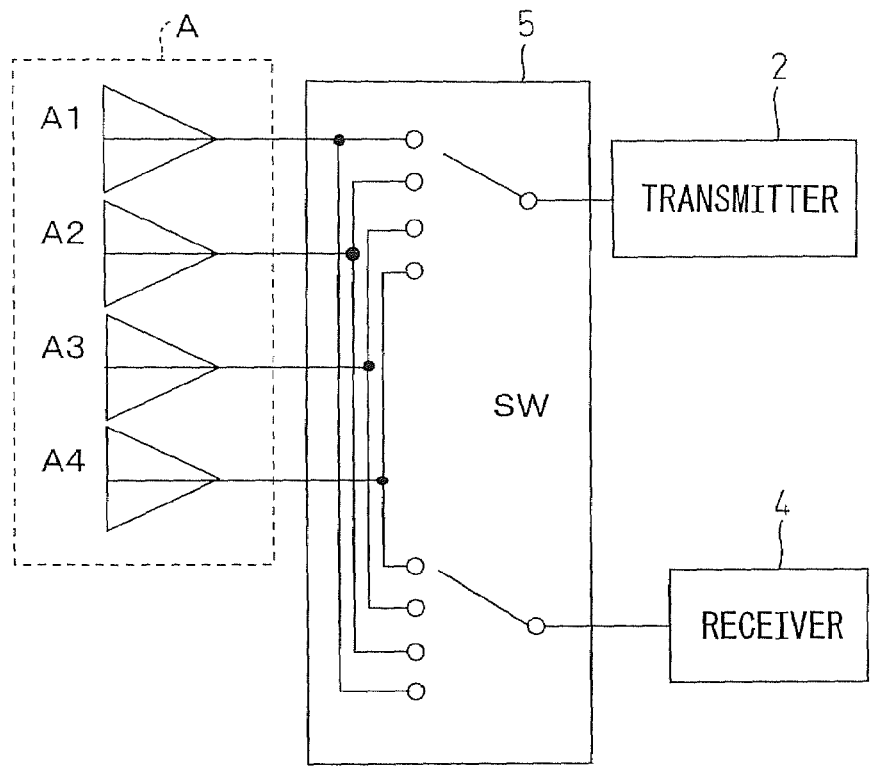
FIG. 14 is a diagram for explaining a first specific example of antenna switching means in the radar apparatus according to the present invention.

In a first specific example shown in FIG. 14, each of the four antennas A1, A2, A3 and A4 is provided with a transmitting port and a receiving port so that the antennas can be connected to the transmitter 2 or the receiver 4 in time division fashion.

Figure 15:
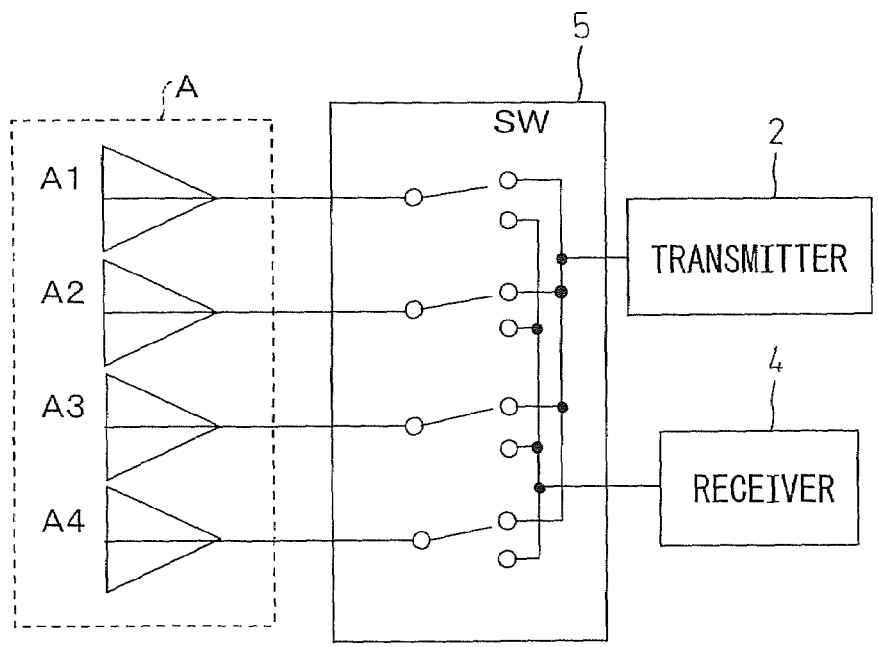
FIG. 15 is a diagram for explaining a second specific example of antenna switching means in the radar apparatus according to the present invention.

In a second specific example shown in FIG. 15, contrary to the first specific example, the transmitting and receiving ports are provided on each of the transmitter 2 and receiver 4 sides. In this example also, the antennas can be connected to the transmitter 2 or the receiver 4 in time division fashion.

Figure 16:
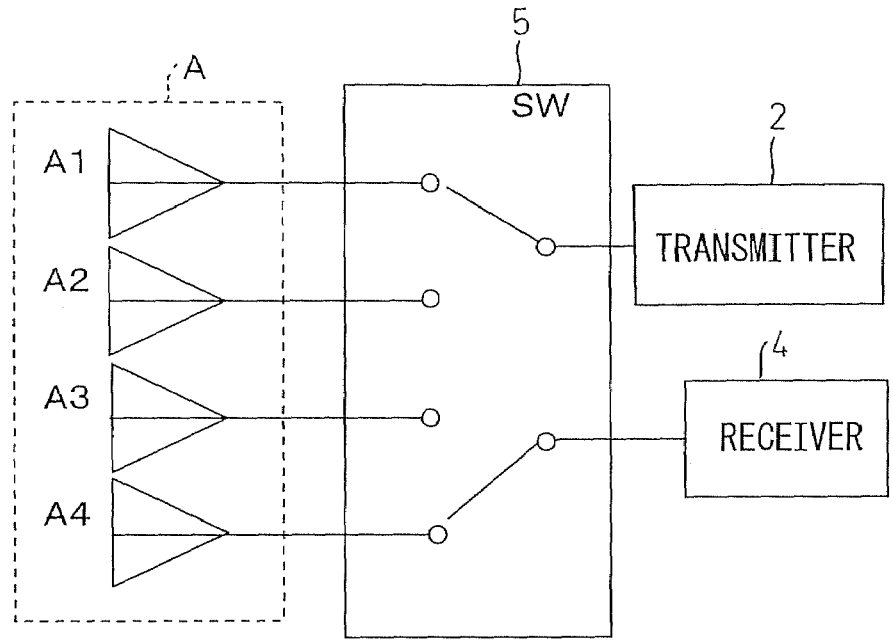
FIG. 16 is a diagram for explaining a third specific example of antenna switching means in the radar apparatus according to the present invention.

In a third specific example shown in FIG. 16, each of the four antennas A1, A2, A3 and A4 is provided with one port so that each antenna can be selected for operation from the transmitter 2 or the receiver 4 side. In this example also, the antennas can be connected to the transmitter 2 or the receiver 4 in a time-division fashion.

Figure 17:
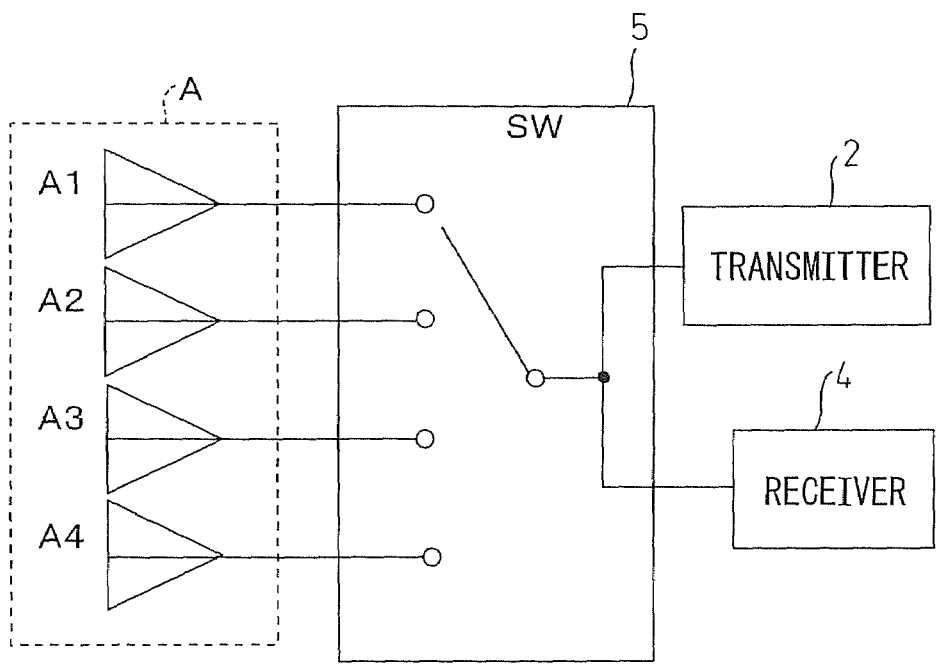
FIG. 17 is a diagram for explaining a fourth specific example of antenna switching means in the radar apparatus according to the present invention.

While, in the third specific example, the transmitter 2 and the receiver 4 can independently control each antenna for connection, in a fourth specific example shown in FIG. 17 a duplexer means is provided within the switching means 5 so that the antennas can be connected to the transmitter 2 or the receiver 4 in a time-division fashion. The duplexer means can be constructed from a hybrid circuit or a distribution circuit to achieve an inexpensive circuit configuration.

Figure 18:
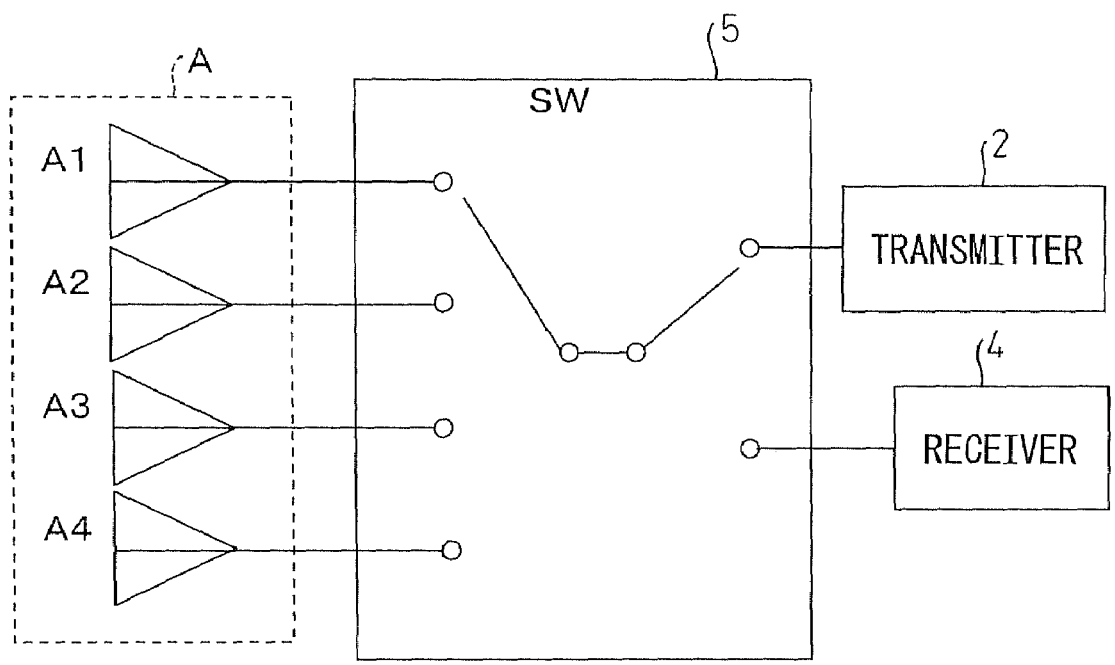
FIG. 18 is a diagram for explaining a fifth specific example of antenna switching means in the radar apparatus according to the present invention.

In a fifth specific example shown in FIG. 18, the duplexer means in the fourth specific example is constructed from a single-pole double-throw switch; in this example also, the antennas can be connected to the transmitter 2 or the receiver 4 in time division fashion.

Here, in the first to fifth specific examples, if the switch SW in the switching means 5 is constructed from a bidirectional switch that can be used for both transmission and reception, the size of the switching means 5 can be reduced.

What is claimed is:

1. A radar apparatus comprising:
a plurality of antennas having identical antenna characteristics, being arranged at unequally spaced intervals in a single row, the plurality of antennas configured to transmit a radio wave as transmitting antennas during continued multiple periods, and receive a reflected radio wave as receiving antennas during the continued multiple periods, said receiving antennas being assigned to receiving signal channels, said receiving signal channels being numbered from 1 to N, said N being larger than the number of antennas;
a plurality of transceivers for transmitting a radio wave from the transmitting antennas and receiving received signals from the receiving antennas, said received signals representing the reflected wave received at the receiving antennas; and
a signal processing unit for selecting a transmitting transceiver which transmits a radio wave during each of the continued multiple periods, selecting receiving transceivers which receive the received signals from the receiving antennas assigned to the receiving signal channels during each of the continued multiple periods, and performing digital beam forming with a first receiving signal channel group and a second receiving signal channel group respectively.

2. The radar apparatus claimed in claim 1, wherein the first receiving signal channel group comprises odd-numbered receiving signal channels and the second receiving signal channel group comprises even-numbered receiving signal channels.

3. The radar apparatus as claimed in claim 1, wherein the first receiving signal channel group comprises a first half of the N channels and a second receiving signal channel group comprises the second half of the N channels.

4. The radar apparatus as claimed in claim 1, wherein all of the plurality of antennas are used for both transmission and reception.

5. The radar apparatus as claimed in claim 1, wherein receiving antennas are assigned to the receiving signal channels during each of the continued multiple periods with reference to the transmitting antenna of the same period.

6. The radar apparatus as claimed in claim 1, wherein the signal processing unit (1) adjusts phases of the received signals during each of the continued multiple periods based on a phase of the received signal received from the receiving antenna that is the same antenna to the transmitting antenna of the same period, and (2) performs digital beam forming based on the phase adjusted received signals.

7. The radar apparatus as claimed in claim 1, wherein in an arrangement of the plurality of antennas, a ratio of antenna spacing between a predetermined pair of adjacent antennas to antenna spacing between another pair of adjacent antennas is 1:2.

8. The radar apparatus as claimed in claim 7, wherein the plurality of antennas include a first, second, third, and fourth antennas arrayed in sequence along a straight line, the first and second antennas are arranged with a first spacing, and the second and third antennas and the third and fourth antennas are arranged with a second spacing, and wherein
the second spacing is twice as large as the first spacing.

9. The radar apparatus as claimed in claim 8, wherein the signal processing unit forms multiple digital beams of eleven channels based on the received signals received at the first, second, third, and fourth antennas during the continued multiple periods.

10. The radar apparatus as claimed in claim 1, further comprising a selector switch for sequentially connecting one of the transceivers to at least two of the antennas, wherein the number of transceivers is smaller than the number of antennas.

11. The radar apparatus as claimed in claim 10, wherein the transceiver is switched for transmission or reception in time division fashion.

12. The radar apparatus as claimed in claim 1, wherein the first receiving signal channel group comprises all of the N channels and the second receiving signal channel group comprises odd-numbered receiving channels or even-numbered receiving channels, and
the signal processing unit performs azimuth detection with either one of the receiving signal channel group in accordance with an environment.

13. The radar apparatus as claimed in claim 1, wherein the first receiving signal channel group comprises all of the N channels and the second receiving signal channel group comprises the first half of the N channels or the second half of the N channels, and
the signal processing unit performs azimuth detection with either one of the receiving signal channel groups in accordance with an environment.

14. The radar apparatus as claimed in claim 1, wherein the plurality of antennas include four antennas arranged at unequally spaced intervals along a straight line, and
the signal processing unit forms multiple digital beams of eleven channels based on the received signals received at the respective antennas during the continued multiple periods.

15. The radar apparatus as claimed in claim 1, wherein the plurality of antennas include four antennas arranged at unequally spaced intervals along a straight line, and
the signal processing unit forms multiple digital beams of a plurality of channels fewer than eleven channels based on some of the received signals received at the respective antennas during the continued multiple periods.

* * * * *